United States Patent [19]
Johnson

[11] Patent Number: 5,930,350
[45] Date of Patent: *Jul. 27, 1999

[54] SYSTEM, METHOD AND COMPUTER PROGRAM FOR AUTOMATED SPEED DIALING

[75] Inventor: William J. Johnson, Flower Mound, Tex.

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/672,134

[22] Filed: Jun. 27, 1996

[51] Int. Cl.⁶ .................................................. H04M 1/64
[52] U.S. Cl. .................... 379/355; 379/88.19; 379/93.24; 358/402
[58] Field of Search .................................. 379/67, 88, 89, 379/90.01, 93.01, 93.23, 93.24, 100.01, 100.08, 354, 355, 356, 201, 142, 67.1, 88.19, 88.2, 88.21; 358/400, 402

[56] References Cited

U.S. PATENT DOCUMENTS

| | | | |
|---|---|---|---|
| 5,283,818 | 2/1994 | Klausner et al. | 379/67 |
| 5,390,236 | 2/1995 | Klausner et al. | 379/67 |
| 5,483,352 | 1/1996 | Fukuyama et al. | 358/402 |
| 5,513,126 | 4/1996 | Harkins et al. | 358/402 |
| 5,526,424 | 6/1996 | Karnowski | 379/355 |
| 5,568,540 | 10/1996 | Greco et al. | 379/89 |
| 5,630,060 | 5/1997 | Tang et al. | 379/89 X |
| 5,651,056 | 7/1997 | Eting et al. | 379/88 |
| 5,657,461 | 8/1997 | Harkins et al. | 395/333 |
| 5,671,269 | 9/1997 | Egan et al. | 379/88 |
| 5,682,460 | 10/1997 | Hyziak et al. | 395/600 |

*Primary Examiner*—Scott Weaver

[57] ABSTRACT

A system and method for automatically configuring speed dial settings on a telephone system. The system receives distributions, such as phone calls, phone messages, E-mail messages, soft facsimiles and print jobs, and determines an identifier (id) corresponding to a sender of the distribution. Information (e.g., telephone number) about the sender is retrieved from an address book database using the sender's id. A speed dial setting is assigned and stored in a speed dial database using the sender's information. The system permits the recipient of the distribution to automatically dial the sender by invocation of the speed dial setting.

20 Claims, 22 Drawing Sheets

FIG. 3

Address Book Data

| Last Name | First Name | Middle Initial | E-mail ID | Phone # | LAN Address | Fax # | Password | Col 8 | ••• | Col N |
|---|---|---|---|---|---|---|---|---|---|---|
| person 1 | | | | | | | | | | |
| ⋮ | | | | | | | | | | |
| person n | | | | | | | | | | |

Speed Dial Data

| User Ph# | Date/Time | Partition | Distribution Type | Speed Dial Setting | Ph # to Dial | Assigned SVC | Name to Dial |
|---|---|---|---|---|---|---|---|
| 5523 | 3/6/96:12:01 | 1 | 00011000 | 1 | 0 | 0 | null |
| 5523 | 0 | 1 | 00011000 | 2 | 0 | 0 | null |
| 5523 | 0 | 1 | 00011000 | 3 | 0 | 0 | null |
| 5523 | 0 | 2 | 00000100 | 4 | 0 | 0 | null |
| 5523 | 0 | 2 | 00000100 | 5 | 0 | 0 | null |
| 5523 | 0 | 2 | 00000100 | 6 | 0 | 0 | null |
| 5523 | 0 | 3 | 00000011 | 7 | 0 | 0 | null |
| 5523 | 0 | 3 | 00000011 | 8 | 0 | 0 | null |
| 5523 | 0 | 3 | 00000011 | 9 | 0 | 0 | null |

402, 404, 406, 408, 410, 412, 414, 416
418a–418i

SYSTEM, METHOD AND COMPUTER PROGRAM FOR AUTOMATED SPEED DIALING

BACKGROUND OF THE INVENTION

1. Field of the Invention

The present invention is directed to computerized telecommunications, and more particularly, to automated speed dialing.

2. Related Art

A typical office contains a telephone, electronic mail (E-mail) system and access to a facsimile device and printer. A person working in the office often uses the telephone to call people on matters associated with E-mail or rendered documents from facsimile and printer devices. For example, a first user distributes an E-mail item to a second user. The second user receives and reads the E-mail distribution. The second user calls the first user for clarification. Likewise, a second user receives a fax or print distribution from a first user. The second user receives and reads the distribution. The second user decides to call the first user for questions, clarifications or for acknowledgment that the distribution was received. The second user may also have to call back a first user who left a telephone message or was previously talked to by telephone.

In each case, the second user had to call back the first user. The second user often does not readily have available the first user's telephone number. A directory software application or hard copy telephone directory may need to be consulted for the first user's telephone number.

A method is needed for decreasing the time it takes to find a person's telephone number. A method is needed for making calls to people more convenient, particularly when the call is related to previous calls, or distributions such as E-mail (electronic mail), fax documents or printer documents.

SUMMARY OF THE INVENTION

The present invention is a system and method for automatically enabling telephone speed dial settings according to most recent office activity. The history of office communications (called distributions), in first-in-first-out (FIFO) order, is used to map a corresponding telephone number to one of a set of identified speed dial settings.

Without actually knowing or caring about a person's telephone number, a user is able to perform a simple speed dial to a person who recently called, left a phone message, sent mail, sent a fax, or printed a document on an attached printer.

The present invention also identifies an associated speed dial setting with a particular distribution. For example, E-mail item subject lines are displayed with an available speed dial setting. Phone mail messages are played and identified with an available speed dial setting. Faxes and print jobs received are identified with associated speed dial settings. A query facility is also provided for determining speed dial information at any time.

As new distributions (messages such as phone calls, voice mail, fax, E-mail or print) are received, the system and method of the present invention sets-up speed dial settings so the user can quickly telephone the sender of the new distributions. New distributions are tracked for automated speed dial settings. Unique function key(s) on the telephone are automatically programmed, thereby permitting the user to directly access and invoke the speed dial settings.

A preferred embodiment of the present invention includes a server process, called a historical distribution correlator (HDC). The HDC runs on any Central Processor Unit (CPU) that is capable of executing code, such as a personal computer (PC), and is connected to, or otherwise has access to, a telephone network, such as a PBX, most likely through a local area network (LAN). The HDC synchronizes access to data on a Speed Dial (SD) database and accesses data from an address book (AB) database. A Standard Query Language (SQL) database implementation is the preferred embodiment for the SD database and the AB database. The SD database and AB database can logically be viewed like a spreadsheet which includes row entries and column fields that are common to each row. Data in the AB database includes people within an enterprise (an enterprise being a business, group of businesses, or simply a collection of people) and relevant information about those people.

Distribution managers are used to correlate speed dial settings with references to received distributions. For example, attributes containing speed dial setting information are maintained with E-mail items. This enables an E-mail application to display an active speed dial setting with the associated E-mail item, for example, with the subject line in the E-mail in-basket list. If the user sees an E-mail item from person A in his E-mail in-basket with a speed dial setting of 3, the user can press the speed dial command followed by the number 3 to automatically speed dial A's number. Similarly with the fax and print managers, the user looks at a list of soft faxes or a list of print requests received and determines whether any speed dial settings have been set. If so, the user can press the speed dial command followed by the appropriate speed dial setting of the reference in order to automatically place a telephone call to the originator of the fax or printjob. On a telephone system, when the user listens to voice messages (i.e., a voice mail distribution), a message is announced with a speed dial setting associated with that message. The speed dial setting will be announced just like a date/time announcement of when the message was left.

The present invention includes a print manager in an embodiment where the PC is a LAN server. A LAN server is given the responsibility of managing disk drives as well as printers on the system. The LAN server is therefore used for sharing system resources among all users on the LAN. The LAN server functions as a print manager for the printers on the system accessible to users on the LAN. Thus, according to this embodiment of the invention, the print manager can also setup speed dialing according to print jobs printed by users on the LAN.

BRIEF DESCRIPTION OF THE FIGURES

The present invention will be described with reference to the accompanying drawings, wherein:

FIG. 3 illustrates a data format for address book database 120, in connection with the present invention.

FIG. 4 illustrates an exemplary format for the data in the speed dial database 122, in connection with the preferred embodiment of the present invention.

The preferred embodiment of the invention is described below with reference to these figures where like reference numbers indicate identical or functionally similar elements. Also in the figures, the leftmost digit of each reference number corresponds to the figure in which the reference number is first used.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

1. System Overview

Figure 1:
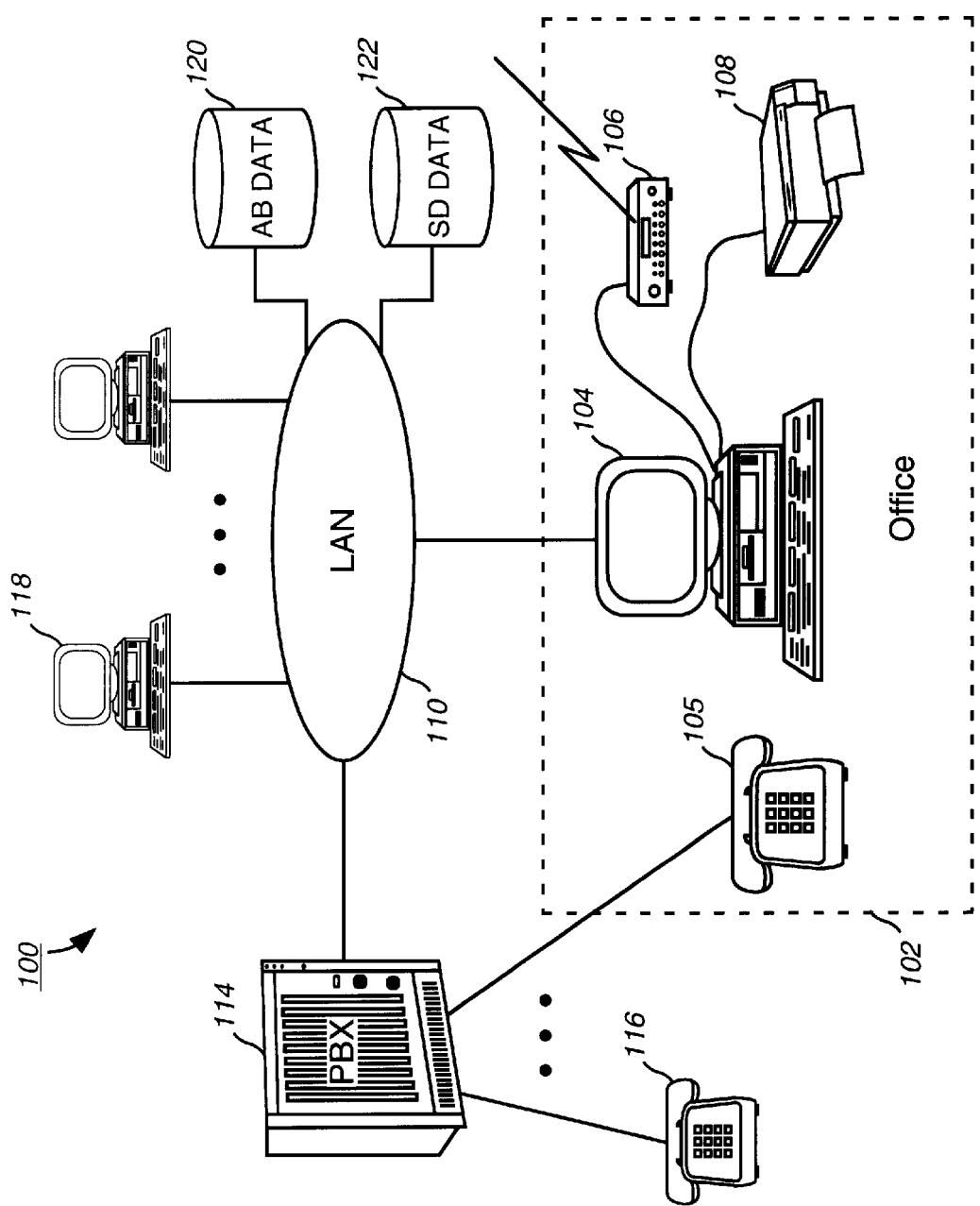
FIG. 1 illustrates a high-level block diagram of an environment for implementing automated speed dialing according to the present invention.

FIG. 1 illustrates a high-level block diagram of a system for implementing the present invention. A communications topology 100 includes an office environment 102 includes at least one personal computer (PC) 104, a telephone 105, a modem 106, and a printer 108. Connected to LAN 110 is a telephone system, such as a private branch exchange (PBX) controller 114 or an equivalent telephone system. Connected to PBX 114 is a telephone 116. An historical distribution correlator (HDC) is also connected to the LAN 110 as shown generally at 118. Also connected to the LAN 110 is an address book (AB) database 120 and a speed dial (SD) database 122. The PC 104, PBX 114, HDC 118, and databases 120 and 122 are connected to LAN 110 in a conventional manner as would be apparent to a person skilled in the relevant art.

Figure 2A:
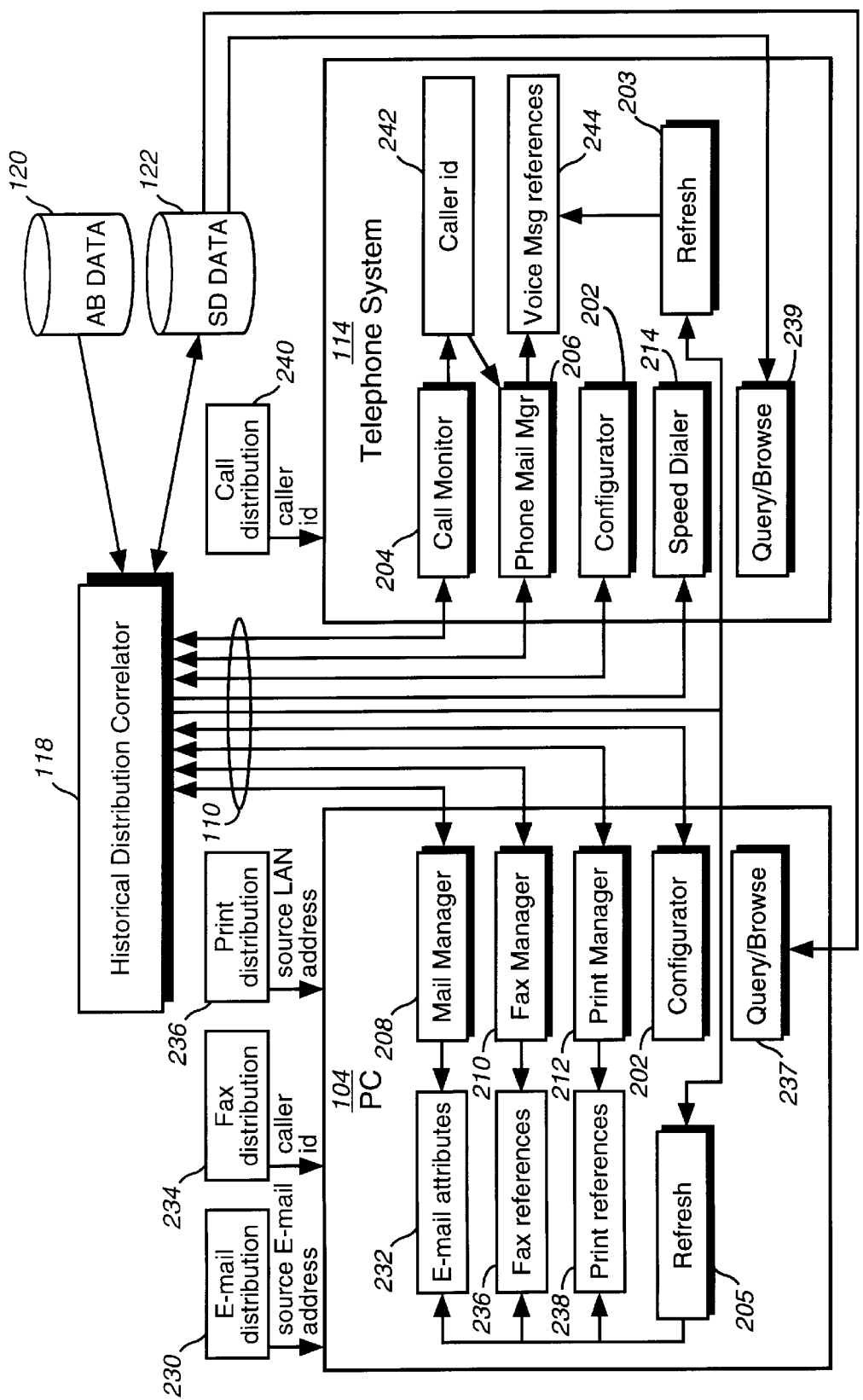
FIG. 2A illustrates block diagrams showing the interaction between PBX 114, HDC 118 and PC 104 according to the present invention.

FIG. 2A illustrates block diagrams showing the interaction between PBX 114, HDC 118 and PC 104 according to the present invention. The PC 104 includes an E-mail manager 208, a fax manager 210, a print manager 212, and a PC refresh process 205.

When E-mail distributions 230 (having a source E-mail address associated therewith) are received by PC 104, the E-mail manager 208 sends a request for a speed dial setting to HDC 118 via LAN 110. In response to the request, HDC 118 communicates with the AB database 120 and SD database 122 to set-up a speed dial setting. Once established, a speed dial setting is sent to the PC 104 and PBX 114 thereby making it available to the user. E-mail manager 208 then associates the speed dial setting to the received E-mail distribution 230 through update of E-mail attributes 232.

The fax manager 210 and print manager 212 operate in a similar fashion as E-mail manager 208. When fax distributions 234 (having a caller id associated therewith) are received by PC 104, the fax manager 210 sends a request for a speed dial setting to HDC 118 via LAN 110. In response to the request, HDC 118 communicates with the AB database 120 and SD database 122 to set-up a speed dial setting. Once established, a speed dial setting is sent to the PC 104 and PBX 114 thereby making it available to the user. Fax manager 210 then associates the speed dial setting to the received fax distribution 234 through the update of fax references 236.

When print distributions 236 (having a source LAN address associated therewith) are received by PC 104, the print manager 212 sends a request for a speed dial setting to HDC 118 via LAN 110. In response to the request, HDC 118 communicates with the AB database 120 and SD database 122 to set-up a speed dial setting. Once established, a speed dial setting is sent to the PC 104 and PBX 114 thereby making it available to the user. Print manager 212 then associates the speed dial setting to the received print distribution 236 through update of print references 238.

The E-mail manager 208, fax manager 210 and print manger 212 are specifically associated with software applications that can run on the PC, as would be apparent to a person skilled in the relevant art. Such software applications typically provide the user with a graphical user interface (GUI) that permit the user to query and browse logs of events such as E-mail, fax, print, or call distributions (a log of events is analogous to a user's E-mail in-basket).

The PC refresh process 205 is invoked by HDC 118 through LAN 110 in order to remove obsolete speed dial setting indicators from E-mail attributes 232, fax references 236, and print references 238.

A query/browse functionality is shown generally at 237 and 239 in PC 104 and PBX 114, respectively. The query/browse functionality allows browsing of a user's settings in the SD database 122.

A configurator 202 is shown in PC 104 and PBX 114. The configurator 202 enables a user for configuring the SD database 122 in preparation for automatic speed dial functionality.

In a similar fashion to PC 104's receipt of E-mail, fax and print distributions, the PBX 114 receives call distributions 240 (having a caller id associated therewith). The call monitor 204 saves the caller id for successfully completed calls, as shown generally at 242, and sends a request for a speed dial setting to HDC 118 via LAN 110. In response to the request, HDC 118 communicates with the AB database 120 and SD database 122 to set-up a speed dial setting. Once established, a speed dial setting is sent to the PC 104 and PBX 114 thereby making it available to the user.

If the call distribution results in the leaving of a voice mail message, the phone mail manager 206 retrieves the caller id and sends a request for a speed dial setting to HDC 118, which in turn sets-up a speed dial setting. The speed dial setting is returned to the PC 104 and PBX 114. The phone mail manager 206 then associates the speed dial setting to the voice mail through voice mail references 244.

Call monitor 204 and phone mail manager 206 operate mutually exclusively so that a single call distribution will cause an automated speed dial setting operation through one or the other, never both.

A phone mail refresh process 203 is invoked by HDC 118 through LAN 110 in order to remove obsolete speed dial setting indicators from voice message references 244.

Note there must be at least one instance of configurator 202 in communication topology 100. The instance of configurator 202 can be at PC 104 and/or PBX 114.

Figure 2B:
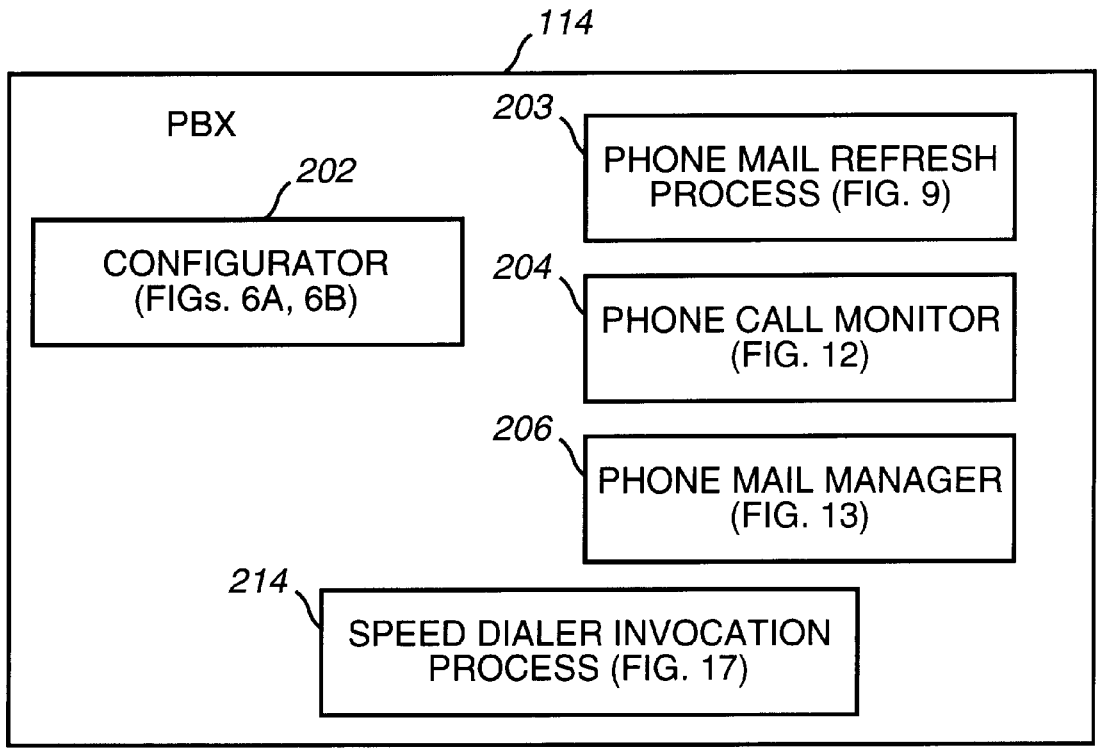
FIGS. 2B, 2C and 2D illustrate block diagrams showing the relationship of FIGS. 6–10 and 12–18 to PBX 114, HDC 118 and PC 104, respectively.
Figure 2C:
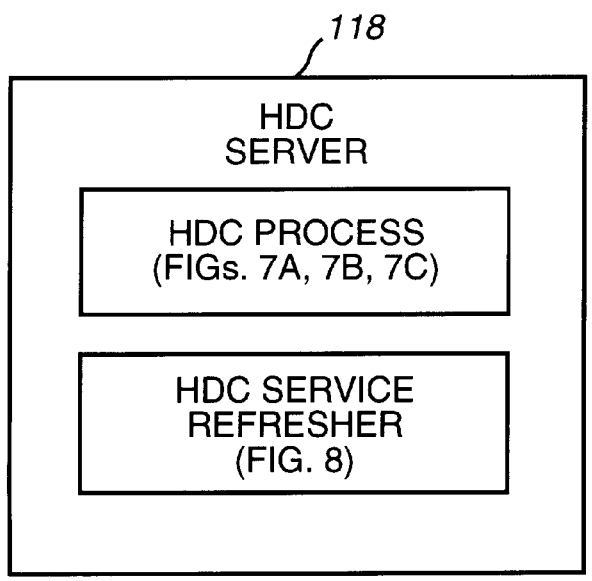
Figure 2D:
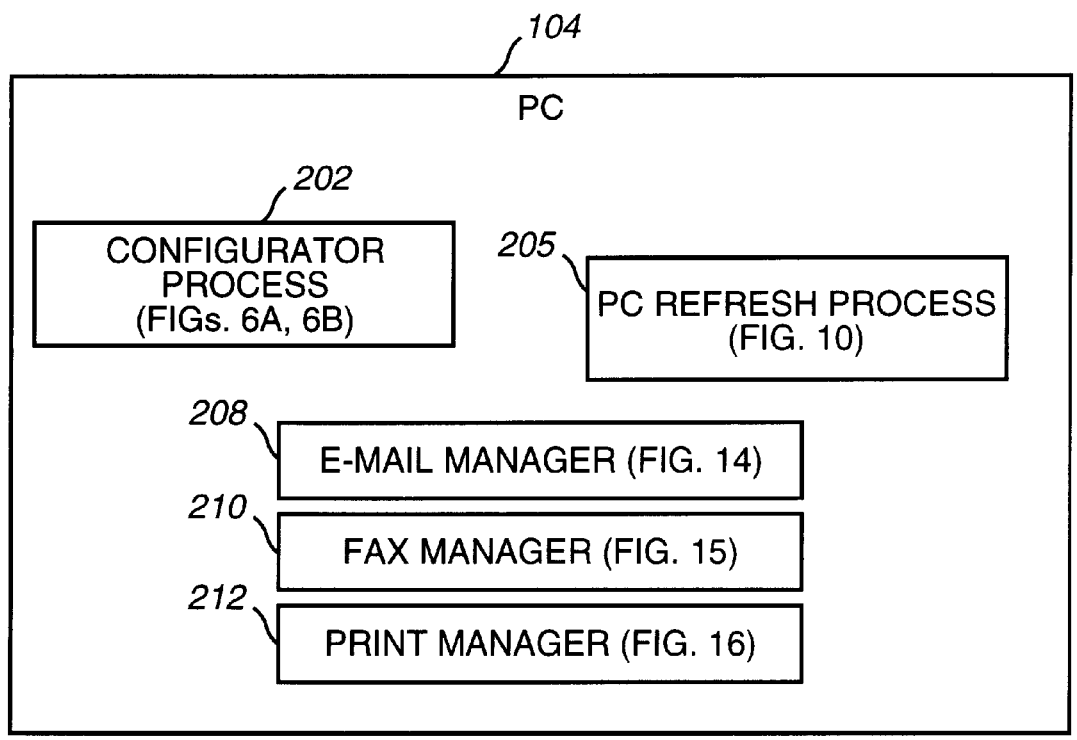

FIGS. 2B, 2C and 2D are block diagrams showing the relationship of FIGS. 6–10 and 12–18 to PBX 114, HDC 118 and PC 104. The present invention is generalized so that it can be implemented as processes (comprising operational steps) that execute on PC 104 and/or the PBX 114. In a specific implementation, these processes are controllers of a computer program product, as described below.

FIG. 2B illustrates that an embodiment of configurator 202 resides on the PBX 114 and is described in connection with FIGS. 6A and 6B. An embodiment of configurator 202 also resides on PC 104, as shown in FIG. 2D. The phone mail refresh process 203 of PBX 114 is described in connection with FIG. 9, call monitor 204 is described in connection with FIG. 12, and phone mail manager 206 is described in connection with FIG. 13. The speed dialer invocation process 214 is described in connection with FIG. 17.

FIG. 2C illustrates HDC 118, which comprises general HDC processing, which is described in connection with FIGS. 7A, 7B, and 7C, and an HDC service refresh process, which is described in connection with FIG. 8.

Figure 10:
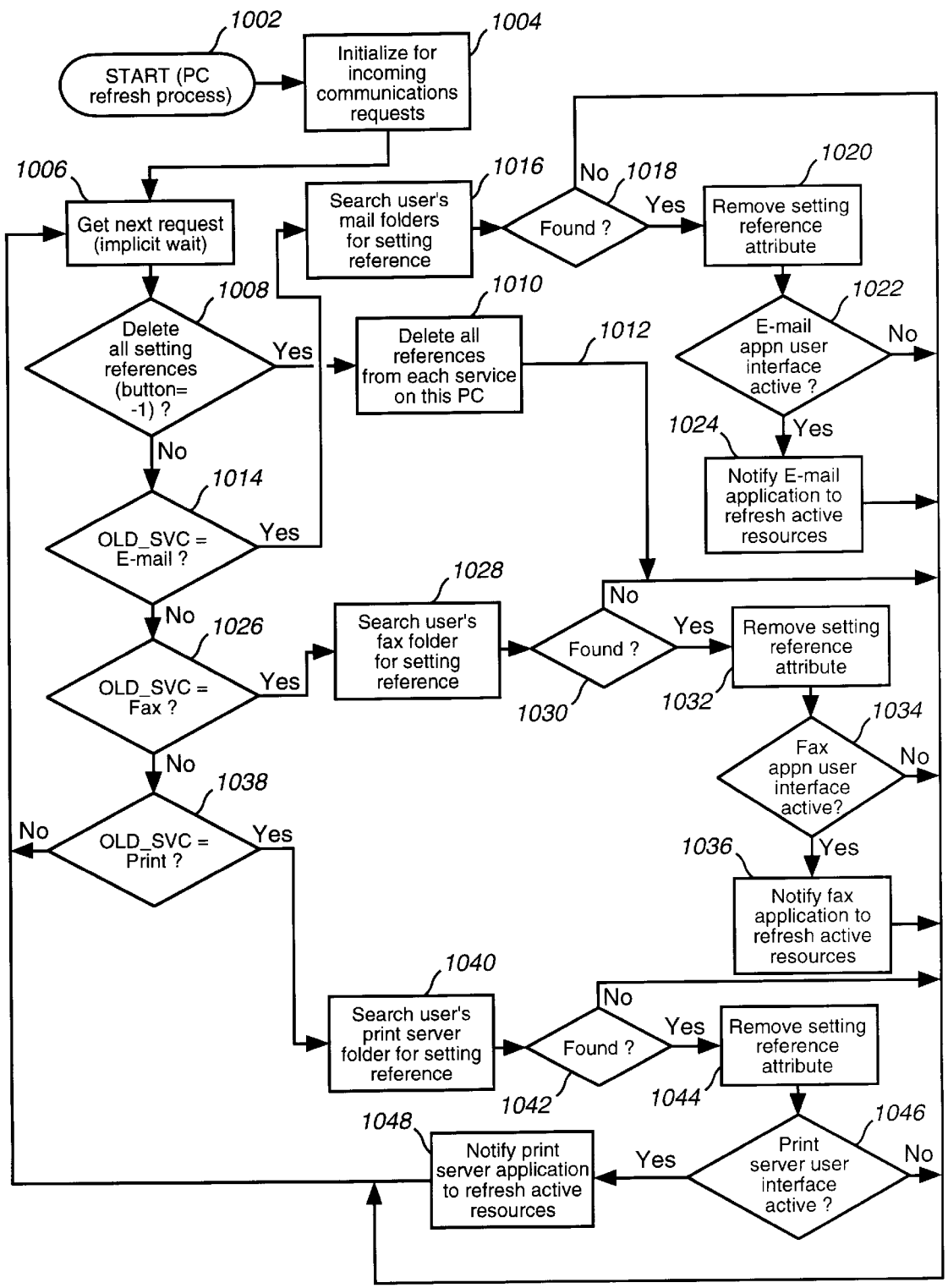
FIG. 10 is a flow diagram illustrating a PC refresh process 205, in accordance with the present invention.
Figure 14:
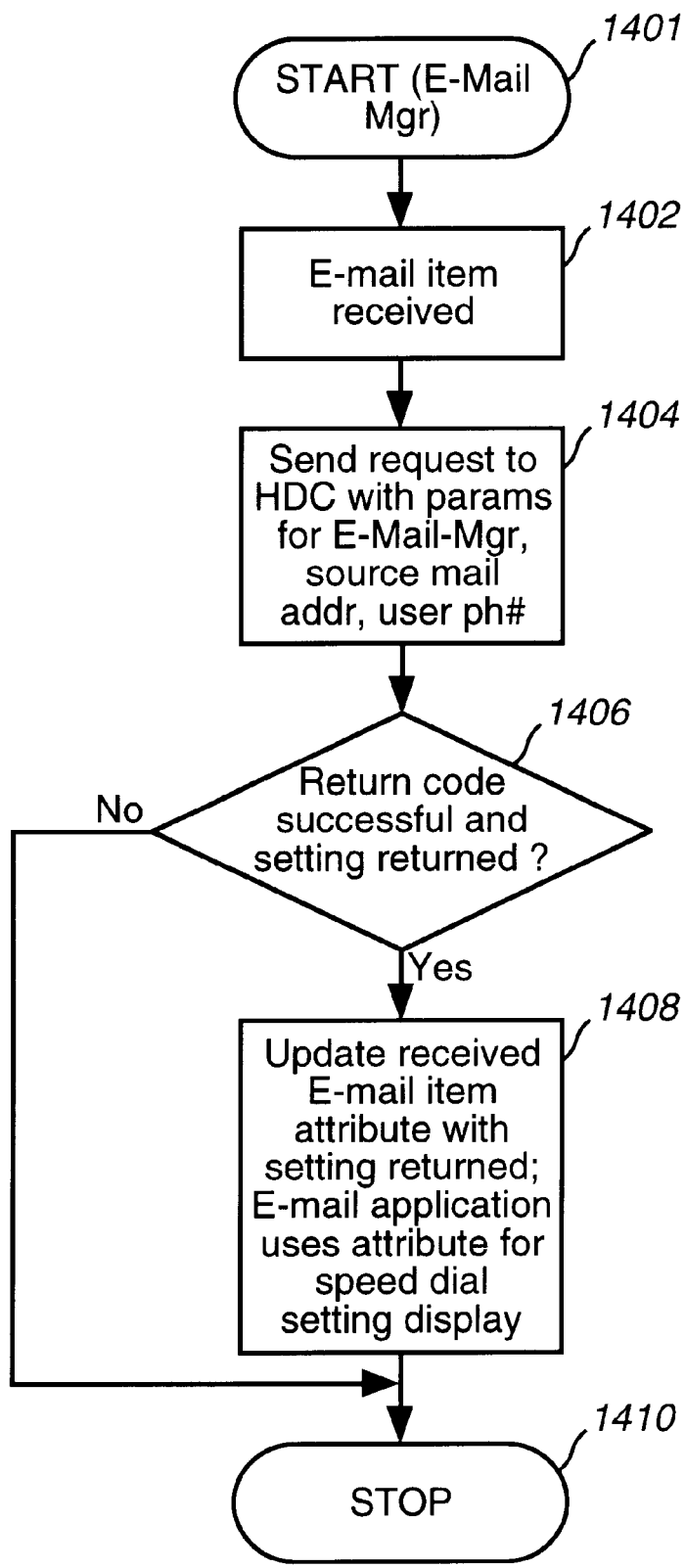
FIG. 14 is a flow diagram illustrating operation of E-mail manager 208, in accordance with the present invention.

FIG. 2D illustrates that PC refresh process 205 of PC 104 is described in connection with FIG. 10, E-mail manager 208 is described in connection with FIG. 14, fax manager 210 is described in connection with FIG. 15, and print manager 212 is described in connection with FIG. 16.

Turning again to FIG. 1, the HDC 118 is a server interface for synchronizing data in connection with the present invention. The HDC 118 runs on a central processing unit (CPU) capable of interfacing with the AB database 120, speed dial database (SD database) 122, PC 104 and PBX 114. The HDC 118 can run on a CPU, or a computer, separate from PC 104 and PBX 114 or can be incorporated into either the PC 104 or the PBX 114.

The AB database 120 is a resource that stores typical address information for an enterprise or business. Information stored in AB database 120 includes, but is not limited to, employees' names, telephone numbers, and addresses (e.g., business address and/or mail stop). The AB database 120 can also store an employee's E-mail address and their PBX identification (id) number (henceforth called the caller id or similar identifier). If an employee has self-fax capability, that employee's fax number can be associated within AB database 120. Similarly, the employee's LAN address can also be stored in the AB database 120.

A commercially available address database that demonstrates a good model for the AB database 120 of the present invention is IBM®'s OV/VM CALLUP™ system. (IBM is a registered trademark and OV/VM CALLUP is a trademark of International Business Machines Corporation.)

FIG. 3 illustrates a format for address book data stored within AB database 120. A row exists in the table for each person in the enterprise. Each row of the table includes data concerning that person's name (constructed from First Name 304, Middle Initial 306 and Last Name 302), E-mail identifier (id) 308, phone number 310, LAN address 312, and fax number 314. An additional field for a password 316 can be included to permit authorized maintenance of the AB database. Other potential AB database 120 columns can be included, as shown generally at columns 318.

The ability to automatically configure a speed dial setting in connection with the invention is prohibited if the address book does not include a row corresponding to a received distribution. For example, if an E-mail is received, the sender's E-mail id is used as a reference to index the address book data. The sender can be designated as unknown if no matching E-mail id is found. Therefore, automatic speed dial setting according to the invention will not be performed. The speed dial system does not abort when the source of the distribution is not found in the address data book. Rather the system simply does not update the speed dial database with a new speed dial assignment if there is no "hit" in the address book for the source of a particular distribution.

FIG. 4 illustrates an exemplary format for the data in the SD database 122 in connection with the preferred embodiment of the present invention. This example table represents the speed dial settings for a single user, but speed dial settings for the entire enterprise may be stored in the SD database 122. The number of rows in the table for a particular user equals the number of speed dial settings capable of being programmed on a given user's telephone. The value that appears in the User Phone Number field 402 identifies the user for which rows 418 applies.

The dialing of a speed dial setting can be accomplished using a single physical speed dial command button followed by pressing one or more numeric keys. In the FIG. 4 example, there are nine speed dial settings corresponding to nine rows, generally referred to as rows 418, in the SD database 122. Speed dial settings for each row are listed in a speed dial setting field 410. Speed dial settings are assigned a unique number.

An alternate embodiment of the present invention supports more than one digit to represent a speed dial setting in speed dial setting field 410. As in conventional speed dial systems, in order to access a speed dial setting, the user must first press a special speed dial command button, or sequence, followed by the number associated with the desired speed dial setting. Alternatively, a speed dial setting can be invoked by pressing a non-numeric keys such as star (*) or pound (#) key followed by the specific number associated with the desired speed dial setting.

The user's phone number field 402 distinguishes the user of the speed dial setting corresponding to that row. The number of digits used to represent the user's phone number in the first column is extensible in further embodiments. For example, some PBX systems require more than four digits to represent all users in the system. In a further embodiment of the present invention, more than four digits will be required for tracking all users in the enterprise. Thus, a national enterprise may require at least 10 digits and an international enterprise may require more.

Date/time stamp field 404 represents when the speed dial setting in the corresponding row was created or last updated in the SD database 122. The date/time stamp provides a means for determining FIFO round-robin assignment of speed dial settings. The assignment of speed dial settings will be described below in connection with FIGS. 7A, 7B and 7C.

The partition field 406 of the SD database 122 includes a partition assignment. Partitioning of the speed dial settings allows grouping of speed dial settings to a specific service or services. Three partitions are shown in this example.

Figure 5:
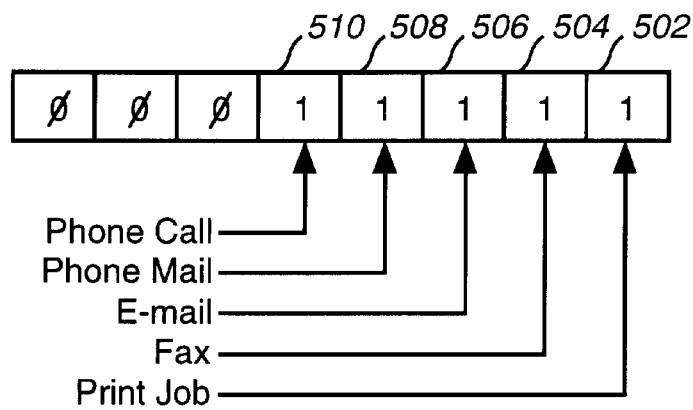
FIG. 5 illustrates the bit mask format for the distribution types in speed dial database 122.

The distribution type field 408, includes a bit mask corresponding to the partition of an associated speed dial setting listed in column 3. FIG. 5 shows the bit mask format for the distribution types. With reference to FIG. 5, an 8-bit field is used. Moving from the least significant bit to the most significant bit, bits represent a print request bit 502, a soft facsimile bit 504, an e-mail bit 506, a phone mail bit 508, and a phone call bit 510, respectively. The three most significant bits are available for other distribution types.

A logic "1" in a field of the bit mask indicates that service is included in the distribution for a given partition. For example, FIG. 4 includes a distribution type "00011000," which indicates that a phone call or phone mail are the only two services included in the first partition. This means speed dial settings 1, 2, and 3 of partition 1 are automatically set for phone calls received and phone mail received. Similarly, the second partition is only for E-mail messages (speed dial settings 4, 5, and 6 are automatically set for E-mail received). Finally, the third partition includes both soft faxes and print requests. Each distribution bit mask can only be set for one partition, and therefore is unique.

According to the exemplary partition illustrated in FIG. 4, three speed dial settings are assigned to each partition. When a new phone call or phone mail distribution occurs, it is assigned one of the first three speed dial settings associated with the first partition. Similarly, if an E-mail distribution is received, it is assigned one of the three speed dial settings having a partition 2 designation, and so forth. A new distribution is assigned a speed dial setting associated with the designated partition in a FIFO round-robin manner using the date/time stamp. In the most straight-forward implementation, this round-robin assignment will simply replace the oldest speed dial setting within the partition when a new reference to that partition is received.

The speed dial assignment field 412 in the SD database 122 includes the phone number to be automatically dialed by the system when the user selects an associated speed dial setting within speed dial setting field 410. The assigned service field 414 of the SD database 122 includes an assigned service reference. The assigned service, such as a phone call, phone mail, E-mail, soft facsimile or print request, will be listed in this column. This service assignment enables speed dial setting reference removal as a setting becomes obsolete as will be discussed below. For example, if all speed dial settings of speed dial setting field 410 are in use and another E-mail distribution arrives, the old reference must be removed from the E-mail in-basket reference so that it can be reused for the most recently arrived E-mail distribution. Assigned service field 414 also permits the user to distinguish a particular speed dial setting when viewing (for example, via a GUI) the contents of the SD database 122. Field 416 in FIG. 4 includes the name of the person to be autodialed. This information is included for convenience of the user when viewing the contents of the SD database 122 and its speed dial settings with the configurator 202 or a browse/query facility shown generally as 237 and 239.

It is important to note that the preferred embodiment of the present invention supports at least two digits to represent a value in the speed dial setting field 410. This allows up to 100 invocable speed dial settings to automatically be configured according to received distributions. Otherwise, too few a number of available settings, as shown in FIG. 4, will cause excess reassignment of available settings for the many distributions that may be received.

2. Automated Speed Dial Setting a. Speed Dial Setting Configurator

The configurator 202 permits the user to specify a set of speed dial settings on a telephone that will be automatically set for returning phone calls in response to distributions received from a particular service or group of services. There will be no rows in SD database 122 until at least one invocation of the configurator 202. For example, if only twelve speed dial settings are permitted on a telephone, three speed dial settings can be designated for people who last called, three speed dial settings for people who last sent e-mail, three speed dial settings for people who last sent a fax and three speed dial settings for people who printed documents on the user's print server. Optionally, the user may specify any number of speed dial settings for automatic enabling any type of distributions desirable for automatic speed dial settings. The user may also configure a single speed dial setting to serve more than one type of distribution. For example, one speed dial setting can be configured for any types of distributions received. The last communication by any method will be associated with that speed dial setting.

The configurator 202 may be embodied with a Dual Tone Multi Frequency (DTMF) interface to a telephone connected to PBX 114, or as a GUI on a computer system such as PC 104.

The configurator 202 can be accessed as a telephone service interface at PBX 114. Hot keys can be provided on the telephone system to enable the user to navigate through the voice mail system and listen to, exchange and/or update information via the telephone system. Thus, in a DTMF interface embodiment of the configurator 202, a user can access the SD database 122 via telephone. The configurator 202 DTMF interface embodiment messaging system abbreviates information common to rows within the SD database. For example, if settings (speed dial setting field 410) 1–25 are assigned to a single partition, the messaging system will abbreviate that information rather than specifying the partition information on a row by row basis. This saves a considerable amount of time when the user accesses SD database 122 information via the voice mail system. The configurator 202 can also be launched by a command line or accessed via a menu including the configurator application, or the like, at PC 104. In a personal computer environment, the user is presented with a scrollable list of entries representing the rows within the SD database 122.

The first level of validation for accessing the SD database 122 using the configurator 202 is via the user's telephone number. Password protection can also be used to prevent users from accessing other users' information, as would become apparent to a person skilled in the relevant art. The user's LAN address is also retrieved for further processing during configuration.

With reference now to the flowcharts, obvious error handling is assumed in order to focus on important elements of the present invention.

Figure 6A:
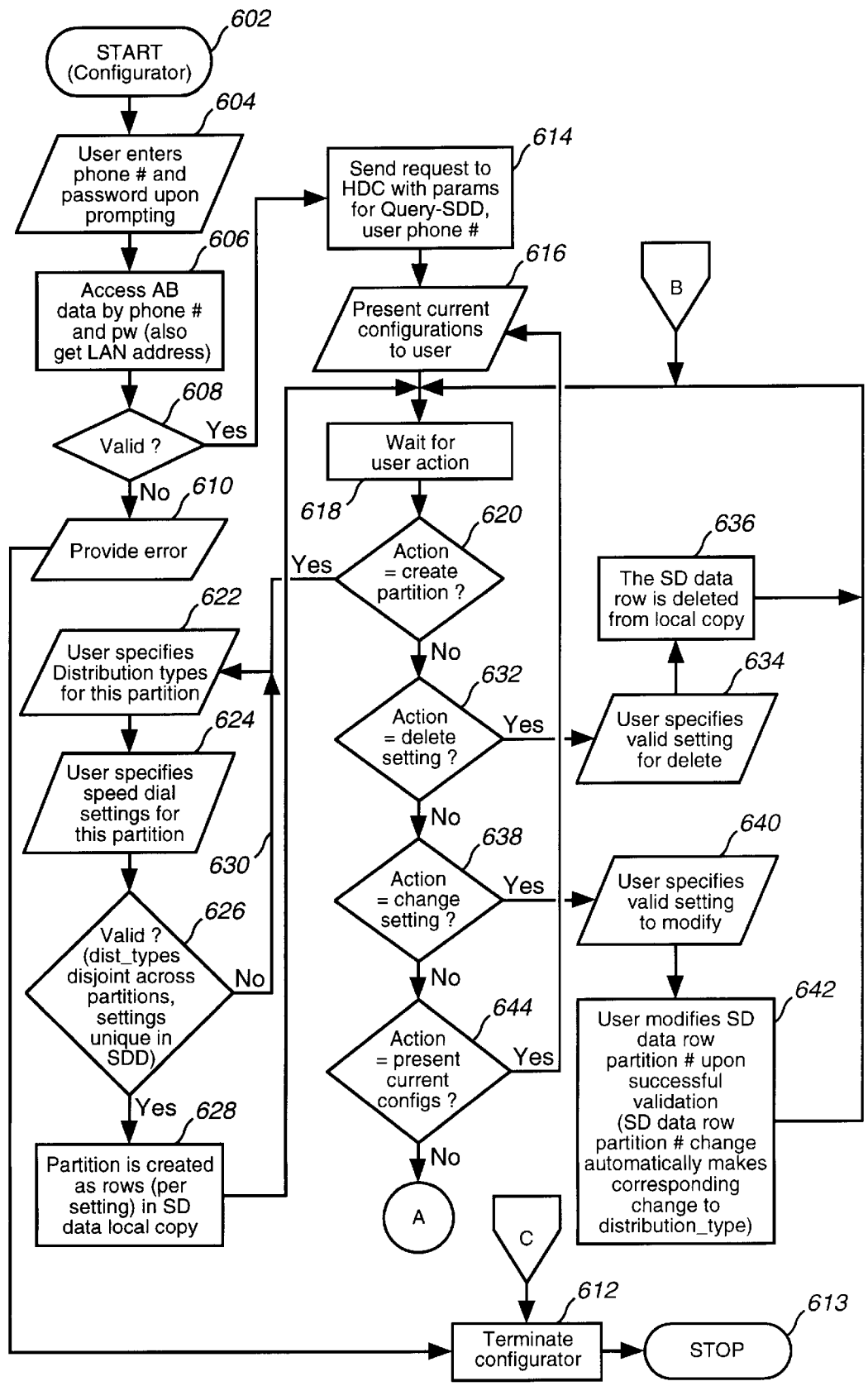
FIGS. 6A and 6B illustrate flow diagrams of the configurator 202, in accordance with the present invention.
Figure 6B:
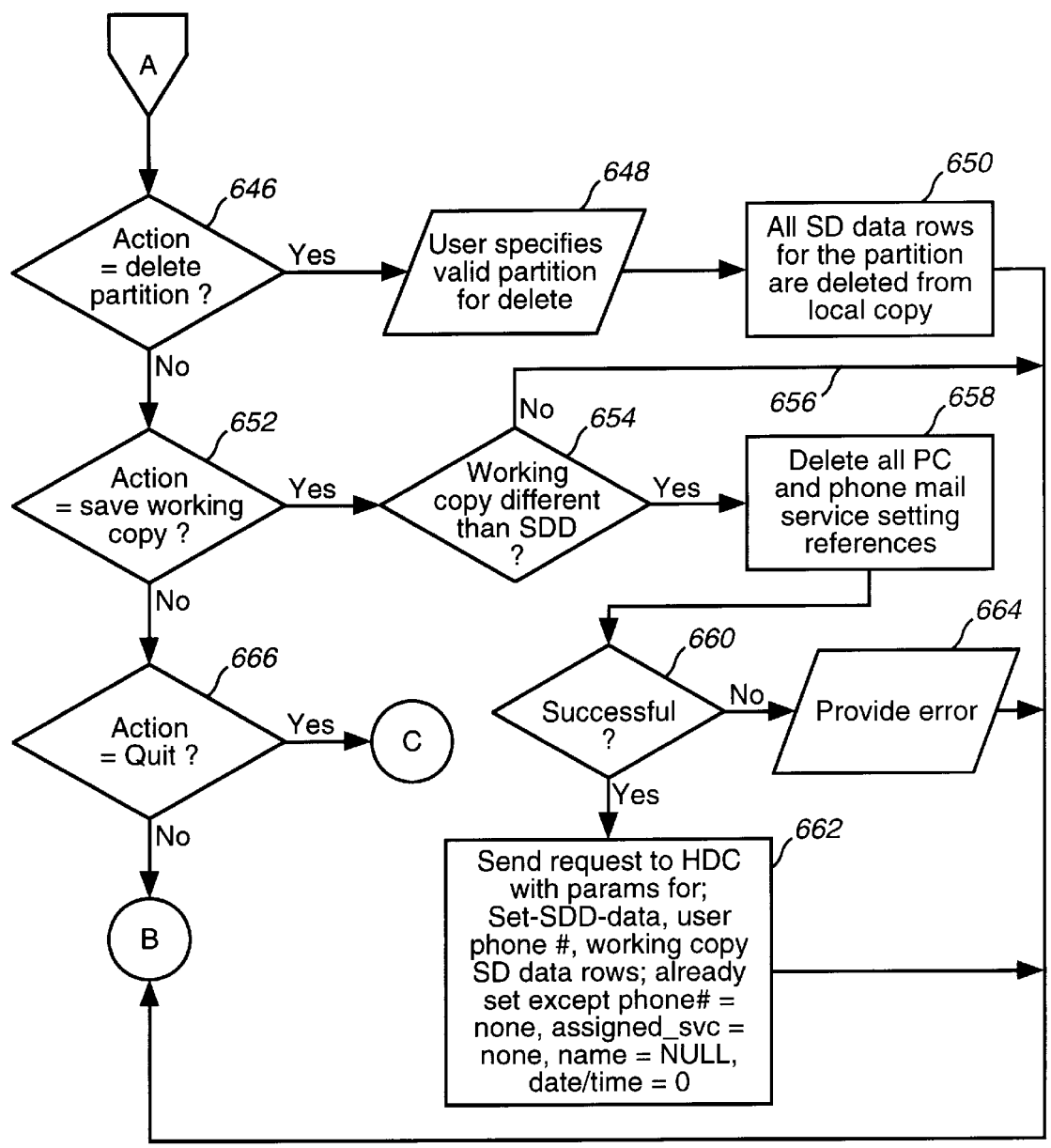

FIGS. 6A and 6B illustrate flow diagrams of the configurator 202, which permits a user to configure the SD database 122. FIGS. 6A and 6B are intentionally generalize for describing either the DTMF interface embodiment or the personal computer environment.

The configurator 202 begins at a step 602. The user enters his phone number (see phone number field 310) and password (see password field 316) upon prompting by the configurator 202, as shown at a step 604. The configurator 202 then accesses the AB database 120 using the phone number and password entered at step 604 and accesses the user's LAN address, as shown at a step 606. At a decisional step 608, the configurator 202 determines whether the user's phone number and associated password are valid. If not, an error is provided to the user at step 610 and the configurator 202 terminates user interface processing at step 612. Thereafter, the configurator 202 terminates at step 613. If the configurator 202 determines that a valid access has been made at a step 608, the configurator 202 sends a request to the HDC 118 with parameters for querying the current speed dial data using the user's phone number as a key, as shown at a step 614 and the HDC 118 returns the user's data from the SD database 122. Note that alternative embodiments may utilize some other unique field in the AB database 120 along with the password in order to authenticate access (steps 604, 606, 608) to speed dial data for the particular user.

The configurator 202 then presents the current speed dial data configurations to the user, as shown generally at a step 616. The configurator 202 then waits for user input at a step 618. In a preferred embodiment the user has seven options at this stage: (1) create a partition, (2) delete a speed dial setting from a partition, (3) change a speed dial setting, (4) re-present the current configurations of the speed dial data settings, (5) delete a partition, (6) save speed dial data to SD database 122, or (7) quit the configurator 202 function.

At a decisional step 620, the configurator 202 determines whether the requested action is to create a partition (see partition field 406). If so, the configurator 202 permits the user to specify the distribution types (see distribution type field data 408) for the partition, as shown at a step 622. The configurator 202 then permits the user to specify speed dial settings (see speed dial setting field 410) for the specified partition, as shown at a step 624. The configurator 202 then determines whether the specified speed dial settings and partition are valid, as shown at a step 626. In other words, the configurator 202 determines whether the distribution types are disjoint across the partitions (i.e., no distribution bit 502, 504, 506, 508, or 510 appears in more than one distribution type field 408 for a partition in the partition field 406 for a particular user as indicated by the user phone number field 402) and whether the speed dial settings (field 410) are unique in the SD database for that user. The speed dial setting field 410 is a unique field for all rows in the table for a particular user as indicated by the user phone number field 402. If the information is valid, the configurator 202 proceeds to create the partition as rows (configurable speed dial settings) in the local copy of the speed dial data, as shown at a step 628. Once the local copy is updated, the configurator 202 returns to the step 618 to wait for further user input. If the configurator 202 determines that the requested change is invalid in step 626, the configurator 202 loops back to step 622 to accept valid input, as shown at 630. If at step 620, the user did not select to create a partition, then step 620 continues to a step 632.

In step 632, the configurator 202 determines whether the requested action is to delete a speed dial setting. If so, the configurator 202 permits the user to specify a valid speed dial setting (see speed dial setting field 410) for deletion as shown generally at a step 634. Validation is assumed at step 634. Thereafter, the configurator 202 deletes the speed dial data row (a row 418) from the local copy of the SD database 122, shown at a step 636. The configurator 202 returns to the wait state 618 after the row is deleted. If the user did not select to delete a speed dial setting, step 632 continues to step 638.

The configurator 202 determines whether the user wishes to change a speed dial setting, as shown at a decisional step 638. If a change is desired, the user specifies a valid speed dial setting to modify, as shown at a step 640. Validation is assumed at step 640. The configurator 202 then permits the user to modify the speed dial data row partition (see partition field 406), as shown generally at a step 642. A speed dial data row partition number change automatically makes corresponding changes to the distribution type field 408 within the corresponding row. A valid partition value is assumed at step 642. The configurator 202 then returns to the wait state 618. If the user did not select to change a speed dial setting, then step 638 continues to step 644.

As shown in step 644, the configurator 202 determines whether the user wants to refresh the user interface with current local copy settings. In the DTMF interface embodiment, current configurations are annunciated appropriately with a reference run number to enable user actions. In the computer system embodiment, the GUI window is refreshed with current speed dial settings from local storage. If the user selected to perform a refresh, the flow loops back to step 616 to present the current configurations to the user.

If none of the actions 620, 632, 638 or 644 are detected by the configurator 202, flow proceeds to step 646 of FIG. 6B, through the connectors shown generally as "A". As shown at a step 646 in FIG. 6B, the configurator 202 determines whether the user wishes to delete a partition. For deletion of a partition, the user specifies a valid partition, as shown generally at a step 648. Validating is assumed at step 648. The configurator 202 deletes, from the local copy, all speed dial data for the rows corresponding to the selected partition (see partition field 406), as shown generally at a step 650. After all of the speed dial settings corresponding to the partition have been deleted, the configurator 202 again returns to the wait state 618, by way of the connectors labeled "B" which returns flow to FIG. 6A. If the user did not select to delete a partition, step 646 continues to step 652.

The configurator 202 determines whether the user wishes to save the working local copy of the current configurations to the SD database 122 step 652. If this action is selected, the configurator 202 determines whether the working local copy of the data is different than that which is found in the SD database, as shown generally at a step 654. If there is no difference between the working local copy and the SD database, there is no need to save the working local copy and the configurator 202 returns to the wait state 618, as shown by at 656. If the working copy is different than the data stored in the SD database 122 (i.e., the user has made changes), the configurator 202 deletes all personal computer and phone mail service speed dial setting references as shown generally at a step 658.

The SD database 122 is overwritten with the local copy of the changes through a step 662 discussed below wherein the speed dial assignment field 412, assigned service field 414, and name to dial field 416, is defaulted to a null value which means the speed dial setting in the speed dial setting field 410 is currently unassigned. Therefore, all outstanding references associated with distributions must be removed. Step 658 is discussed in detail with reference to FIG. 18, which is discussed below.

If the deletion is successful, as determined at a step 660, the configurator 202 sends a request to the HDC 118 for update of the SD database, as shown at a step 662. Users update their SD database 122 rows 418 through client/server processing which transmits a request from the configurator 202 to the HDC 118. The HDC 118 is the server. Step 662 assumes a successful return from the HDC 118 before continuing back to step 618. Obvious error handling is assumed. If the deletion in step 658 was not successful, as determined by step 660, an error is provided as shown at a step 664. After step 662 completes, or an error is signaled at step 664, the configurator 202 returns to the wait step 618.

If the user did not select to save the working local copy, step 652 continues to step 666 where the configurator 202 determines whether the user wishes to quit the configurator 202 at a step 666. If a quit request is received, the configurator 202 proceeds back to the terminate configurator step 612, by way of the connectors labeled "C". Otherwise, the configurator 202 returns to the wait state 618 by way of the connectors labeled "B".

Figure 18:
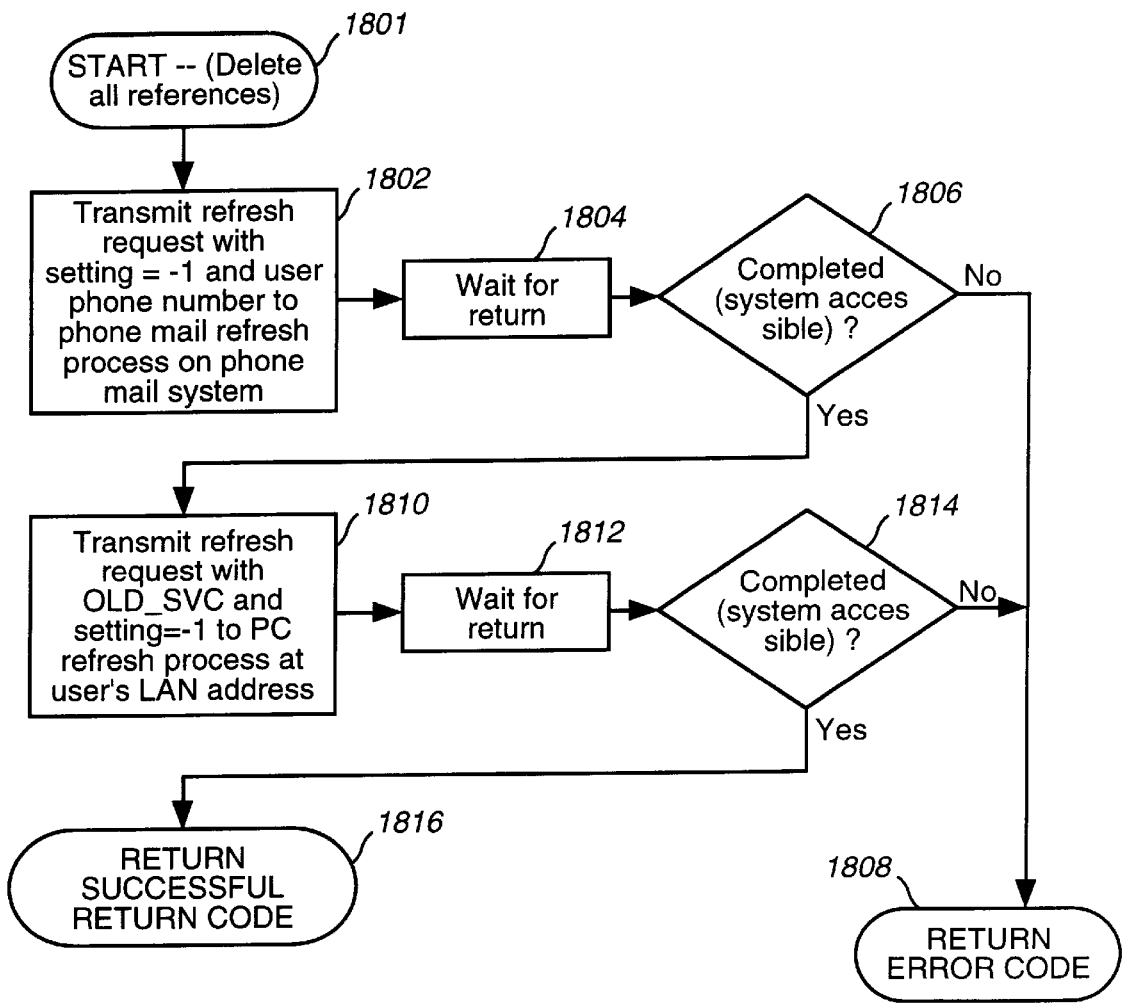
FIG. 18 is a flow diagram illustrating the delete all references step 658 of FIG. 6.

A flow diagram illustrating operation of step 658 will now be described in connection with FIG. 18. FIG. 18 can be logically viewed as a subroutine. The configurator 202 begins the delete reference process at a step 1801. A refresh request with speed dial setting set equal to (−1) and the user's phone number are transmitted to the phone mail refresh process (203) on the phone mail system, as shown at a step 1802. The −1value indicates to the phone mail refresh process 203 that this is a delete all references request. The configurator 202 then waits for a return code at a step 1804, and determines whether the refresh/deletion has been completed, as shown at a decision step 1806. If the deletion does not occur or the system is not accessible, as indicated by a communicating time out, a return error code is sent to the configurator 202, as shown generally at a step 1808. The return code is used at step 660 of FIG. 6B. If the request is successfully completed, a refresh request is transmitted with speed dial setting and old service (OLD_SVC) set to (−1). The request is transmitted to the PC refresh process 205 at the user's LAN address (retrieved by step 606), as shown generally at a step 1810. The configurator 202 then waits for a return code at a step 1812, and determines whether the refresh to the PC has completed, at a step 1814. If the refresh is successfully completed, the configurator 202 returns a successful return code message to the user, as shown generally at a step 1816. Otherwise, an error code is returned for step 660, as shown at 1808.

In the DTMF interface embodiment of the configurator 202, steps 1802, 1804, and 1806 can be replaced with a direct invocation of the phone mail refresh process 203 at PBX 114. Similarly, the computer system embodiment of the configurator 202, steps 1810, 1812, and 1814 can be replaced with a direct invocation of the PC refresh process 205 at PC 104.

b. Historical Distribution Correlator

The HDC 118 manages information associated with the distributions logged into the SD database 122. The SD database 122 thus reflects a history of distributions in an appropriate number of partitions. The number of partitions depends on the number of partitioned speed dial settings. If a user configured all distribution types to a single set of speed dial settings, then a single partition will exist. If a user configured one set of speed dial settings for E-mail, one set for phone calls received, and one set for fax and print documents, then there will be three partitions.

Each partition contains a depth of entries depending on the number of speed dial settings specified in the set of associated speed dial settings. Before an entry is logged in the partition, the telephone number is determined for the originator of the distribution and the next available speed dial setting is determined. An entry is inserted into the SD database 122 if there is a speed dial setting not in use. An entry replaces an existing entry if all speed dial settings have been assigned. A round-robin selection process is used to select a speed dial setting to replace when more distributions are received than there are configured speed dial settings.

Figure 7A:
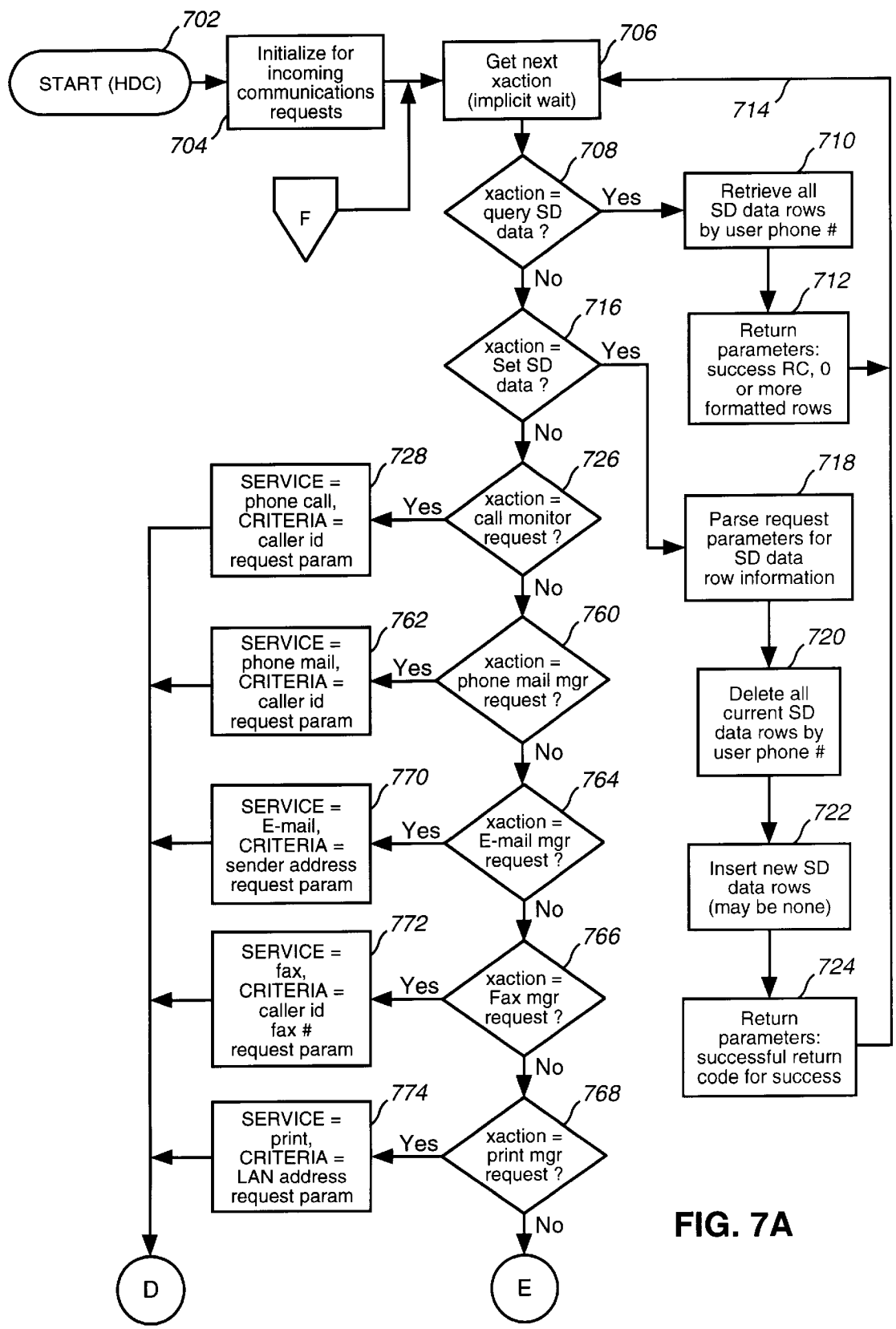
FIGS. 7A and 7B, 7C, and 8 are flow diagrams illustrating the operations performed by the HDC 118, in accordance with the present invention.
Figure 7B:
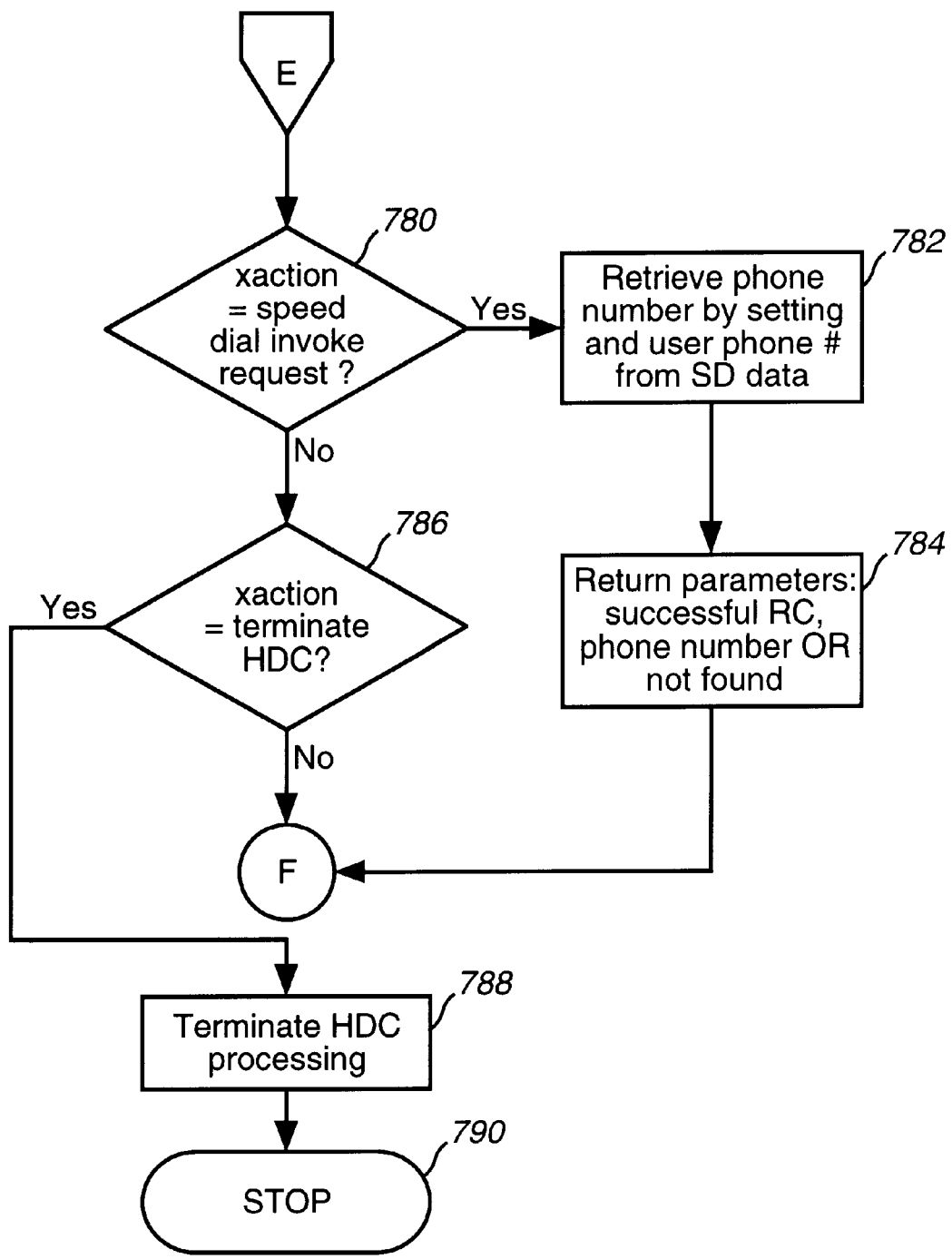
Figure 7C:
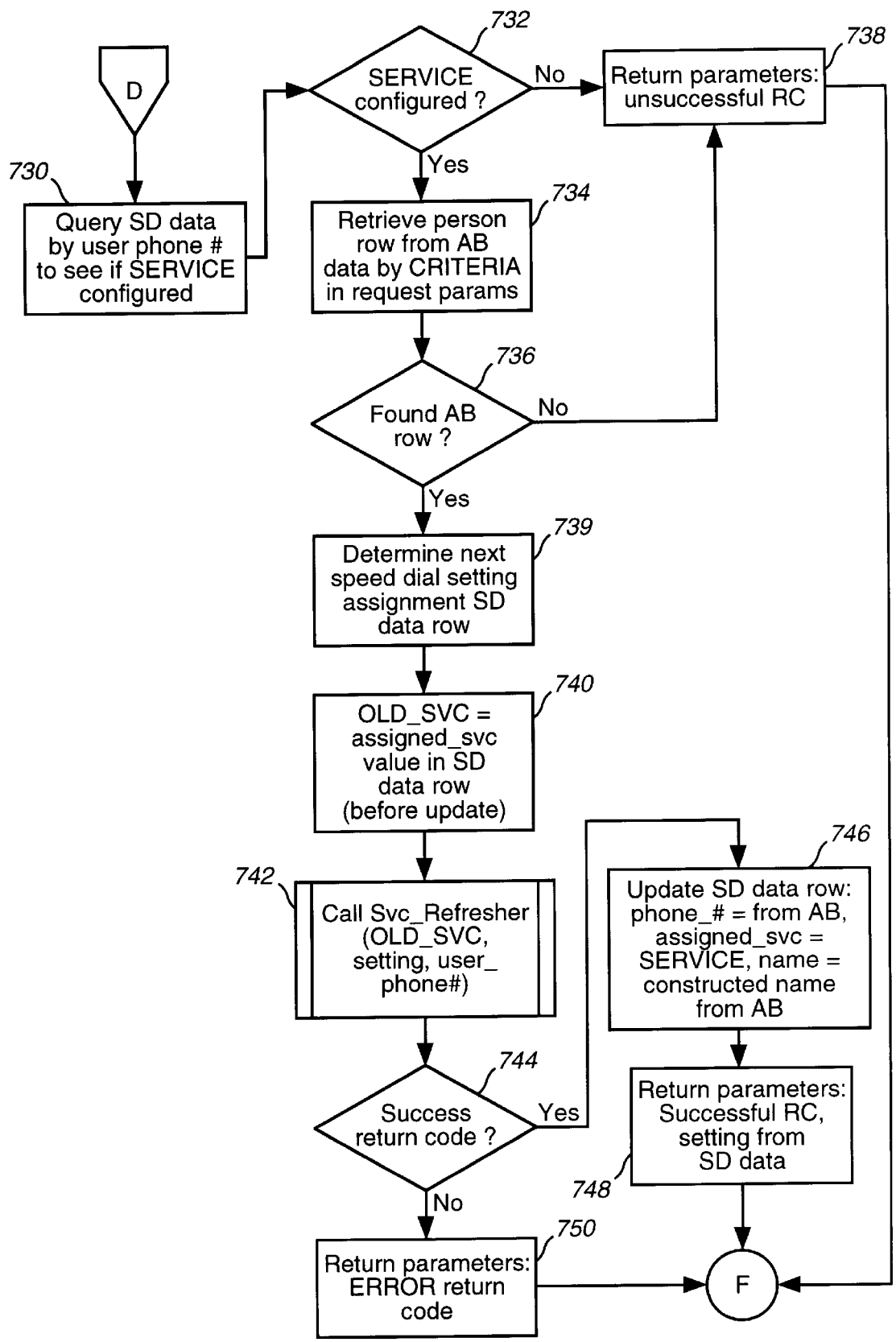
Figure 8:
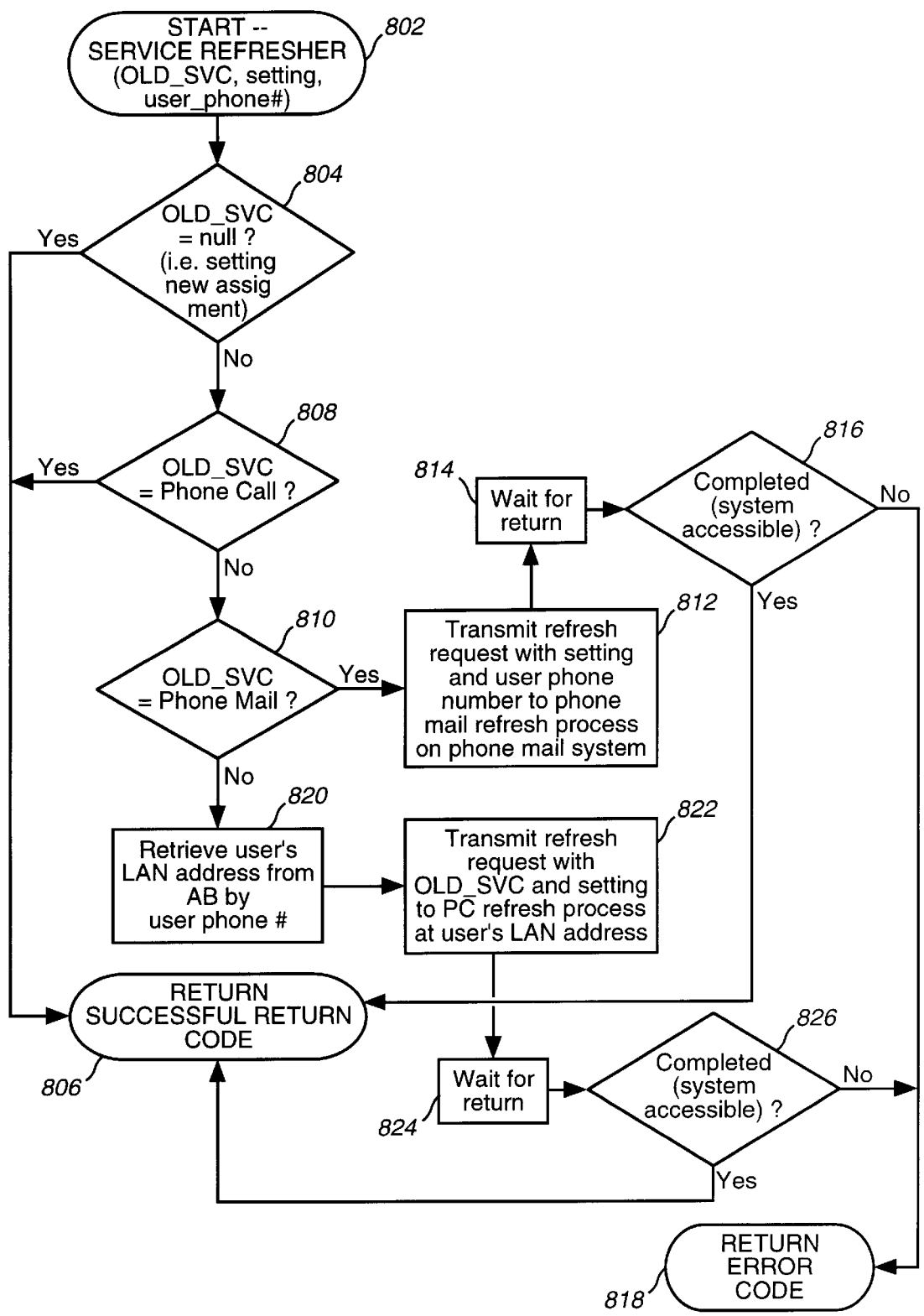

FIGS. 7A, 7B and 7C are flow diagrams that illustrate the operation of the HDC 118. The HDC 118 is a server located in the LAN 110, which is accessible by the PBX 114 and the PC 104. The HDC 118 (1) handles all user speed dial requests, (2) provides synchronization to, and integrity of all data for the speed dial system, and (3) handles queries to the speed dial system data, sets the speed dial system data, and handles requests from all of the manager types in the network. The manager types include the phone call monitor 204, phone mail manager 206, E-mail manager 208, fax manager 210, and print manager 212.

HDC processing begins at a step 702. HDC 118 initializes for incoming communication request at a step 704. HDC 118 then enters an implicit wait state until a next transaction is received, as shown generally at a step 706. A number of decisional steps are shown below step 706 that illustrate the operations performed when a new transaction is received. New transactions are essentially placed in a queue (see FIG. 11 below). Each transaction is processed from the queue in a first-in, first-out (FIFO) order. Step 706 is essentially a queue entry retrieval step that enters a wait state until an entry is available for processing.

The HDC 118 determines when a received transaction is a query to the SD database 122, as shown generally at a step 708. Configurator 202 step 614 makes such a request. If a query to the SD database 122 is received, the HDC 118 retrieves all speed dial data rows corresponding to the user's phone number (compared to user phone number field 402), as shown generally at a step 710. The parameters returned are a successful return code, and zero or more formatted rows from the SD database 122, as shown generally at a step 712. Processing then loops back to the transaction retrieval step 706, as shown at 714.

The HDC 118 determines whether the transaction is a request to set SD database 122 rows 418, as shown generally at a step 716. Configurator 202 step 662 makes such a request. If so, the request parameters are parsed for speed dial data row information, as shown at a step 718. Next, all current speed dial data rows for a user (corresponding to the users phone number) are deleted at a step 720. Zero or more new speed dial data rows are then inserted into the SD database 122 at a step 722. HDC 118 then transmits a successful return code message back to the requestor (e.g., configurator 202) at a step 724. Finally, HDC 118 returns to the transaction retrieval step 706.

If HDC 118 determines that a transaction is a call monitor request, as shown at a step 726, it sets a variable SERVICE to the value "phone_call" and a variable CRITERIA to the AB database 120 search field, phone number field 310 and the value "caller_id" from the request parameters, as shown generally at a step 728. Call monitor 204 step 1208 makes such a request. Once these variables are set, step 728 proceeds to FIG. 7C, as shown generally at the connectors labeled "D".

At FIG. 7C, the HDC 118 queries the SD database 122 with the user phone number (a request parameter) to see if the service, as indicated by the SERVICE variable, is configured, as shown generally at a step 730. If SERVICE is configured in the SD database 122 rows 418 for the user (by user phone number request parameter), as determined at a step 732, a row is then retrieved from AB database 120 using the contents of the variable CRITERIA, as shown generally at step 734. For example, if arrived to step 730 from step 728, then step 732 determines if the call monitor service is configured by having phone call bit 510 set to 1 in the distribution type field 408 of one or more rows 418 for the user associated with the request. The variable CRITERIA contains the values which indicate how to search the AB database 120. For example, if step 734 was arrived at by step 728 processing, then step 734 returns the row from the AB database 120 (which has a phone number field 310 that matches the caller's phone number). If SERVICE was not configured, as determined by step 732, or if a row does not match from the AB database 120 according to CRITERIA, as determined at a step 736, flow proceeds to a step 738 where an unsuccessful return code message is returned to the transaction requester (one of the managers). For example, if step 738 was arrived to by way of step 728 processing, the call monitor 204 is sent the return code message. HDC 118 then returns to the transaction retrieval step 706, as shown by the connectors labeled "F".

If the row was found at step 734, HDC 118 determines the next speed dial setting to the appropriate row 418 of the SD database 122, as shown generally at a step 739. The date/time field 404 and distribution type field 408 are used to determine the appropriate row to update in the user's rows 418. Before updating the SD database 122 row 418, HDC 118 sets the variable OLD_SVC to the value currently in the assigned service field 414 of that row, as shown generally at a step 740. HDC 118 then places a call to the service refresher subroutine and passes parameters of the OLD_SVC variable contents, the value of the speed dial setting field 410 of the row 418 to be updated and the user phone number request parameter, shown at a step 742. If a successful return code is received from the service refresher, as shown at a step 744, HDC 118 updates the following information in the SD database 122 row: speed dial assignment field 412=phone number field 310 from step 734, assigned service field 414=value in the SERVICE variable, name to dial field 416=name constructed from AB row retrieval at step 734 (first name field 304, middle initial 306, last name 302), as shown at a step 746. HDC 118 then returns a successful return code message and the newly assigned speed dial setting (speed dial assignment field 410 of the row 418 updated) to the transaction requester, as shown generally at a step 748, and returns to the transaction retrieval step 706. For example, if step 748 was arrived to by way of step 748 processing, the call monitor 204 is sent the return information at step 748. If HDC 118 receives an unsuccessful return code from the service refresher, as determined at step 744, an error code is returned to the transaction requester at step 750.

The processing just described in connection with FIG. 7C is also performed in response to transactions received from other transaction requesters such as the phone mail manager 206, E-mail manager 208, fax manager 210, and the print manager 212.

Referring again to FIG. 7A, the HDC 118 also determines if a transaction is a phone mail manager request, as shown at step 760. The phone mail manager 206 makes such a request. If the request is a phone mail transaction request, the HDC 118 sets the variable SERVICE to the value phone_mail and the variable CRITERIA to the AB database 120 search field, phone number field 310, and the value caller_id, as shown at a step 762. The remaining processing of a phone mail manager request is similar to that described above in connection with a call monitor request.

Similarly, if the transaction is an E-mail manager 208 request (see step 764), a fax manager 210 request (see step 766), or a print manager 212 request (see step 768), the HDC will appropriately set the SERVICE and CRITERIA variable at steps 770, 772, and 774, respectively. Table 1 shows the SERVICE and CRITERIA request parameter settings associated with each type of request process at steps 728, 762, 770, 772, and 774.

TABLE 1

| Transaction Request Type | SERVICE Request Parameter | CRITERIA Structure Request Parameter |
|---|---|---|
| Call Monitor Request (726) | Phone_call | Phone number field 310/Caller_id |
| Phone Mail Manager Request (760) | Phone_mail | Phone number field 310/Caller_id |
| E-mail Manager Request (764) | E-mail | E-mail identifier field 308/Sender_address |
| Fax Manager Request (766) | Fax | Fax number field 314/Caller_id |
| Print Manager Request (768) | Print | LAN address field 312/LAN_address |

The CRITERIA variable tells step 734 how to search AB database 120 and with what data on which to match. The SERVICE variable tells step 730 which bit of the distribution type field 408 to check for the appropriate row(s) 418, and tells step 746 the value for update of the assigned service field 414.

Final processing performed by HDC 118 will be described in connection with FIG. 7B. The detection of speed dial invocation transaction requests from a user of office environment 102 is shown generally at a step 780. HDC 118 retrieves the phone number from the SD database 122 using the speed dial setting and the user phone number from the request parameters, as shown generally at a step 782. Specifically, speed dial setting field 410 and user phone number field 402 is matched for the appropriate row 418. It then returns a successful return code and the phone number (from speed dial assignment field 412), or a not found error code, as shown generally at a step 784. The HDC then returns to the transaction retrieval step 706. Finally, if HDC 118 receives a terminate transaction at step 786, it terminates processing at a step 788. Thereafter, HDC 118 terminates at step 790. An administrator can terminate the HDC 118 local or remote to the server with a command, or the like.

FIG. 7C shows querying of the SD database 122 to see if the service is configured at step 730. When a given manager receives a distribution, for example, a new E-mail, fax, print request, phone call, or phone message, that manager transmits a request to the HDC 118. The HDC decides whether the distribution received by a manager needs to be tracked. For example, if the distribution was a fax received by the fax manager, the HDC must determine whether the SD database 122 is configured with a partition for tracking incoming faxes. If no service is configured in the SD database 122, no tracking of the received distribution occurs. If the service is configured, the relevant row in the AB database 120 is retrieved in order to process the distribution.

The OLD_SVC variable is set in step 740 in order to enable removal of any old references to the speed dial setting before it is given a new assignment. A reference is any type of attribute, control logic or GUI field that references a speed dial setting. (An attribute is any information concerning a distribution that is part of the message, such as the subject matter line of an E-mail, or the date/time stamp, or the like.) So when a speed dial setting changes, any references to an old speed dial setting must be deleted. For example, if an E-mail item displays the speed dial setting 3 which is in the process of being reused for another distribution, the 3 reference must no longer be displayed with the E-mail item because it is obsolete. If an old speed dial setting cannot be removed, an error return code is generated and detected at step 744. The successful speed dial assignment is returned at step 748 to the requesting manager so that information can be placed in the appropriate reference, for example the subject line of a new E-mail distribution.

The HDC service refresh process called in step 742 will now be described in connection with FIG. 8. The HDC service refresh process is passed the OLD_SVC to be evaluated, along with the speed dial setting and the user phone number from HDC 118 request parameters, as shown generally at a step 802. In general, a successful return code will be sent if the speed dial row can be updated by removing the old reference. If the service refresh process determines in step 804 that the OLD_SVC is null, the speed dial setting sought to be used is not assigned, so a successful return code can be returned, as shown generally at a step 806.

Next, if step 808 determines that OLD_SVC is set to phone_call, there is no abstract, reference, subject line, or other information to be updated; therefore, the appropriate row 418 can be used for a new assignment, in which case a successful return code is returned in step 806.

If in step 810 the OLD_SVC variable is phone_mail, the service refresh process must transmit a refresh request with the speed dial setting and user phone number to the phone mail refresh process (203) on the phone mail system, as shown generally at step 812.

If the refresh process receives a reply indicating that the system was accessible (i.e., refresh completed), as shown generally at a step 816, a successful return code is sent to the HDC 118 at step 806. Alternatively, if the refresh process does not receive an acknowledgment that the phone mail refresh process performed the refresh (i.e., response timeout), then the service refresh process returns an error code, as shown generally at 818.

If the OLD_SVC variable did not equal a null, a phone call, or phone mail, it must have been an E-mail, fax, or print request. Thus, at the "NO" branch of step 810, the refresh process must first retrieve the user's LAN address from the AB database 120 using the user phone number, as shown generally at a step 820. The service refresh process then transmits a refresh request with the OLD_SVC parameter and the speed dial setting to PC refresh process 205 (see FIG. 10) at the user's LAN address, as shown generally at a step 822. The service refresh process then waits for a reply from the PC refresh process, as shown at step 824. The PC refresh reply is evaluated at step 826. A successful return code is sent at 806 or an error code is sent at step 818 depending on the result of the evaluation performed at step 826. Step 826 processing is the same as processing of step 816.

Figure 9:
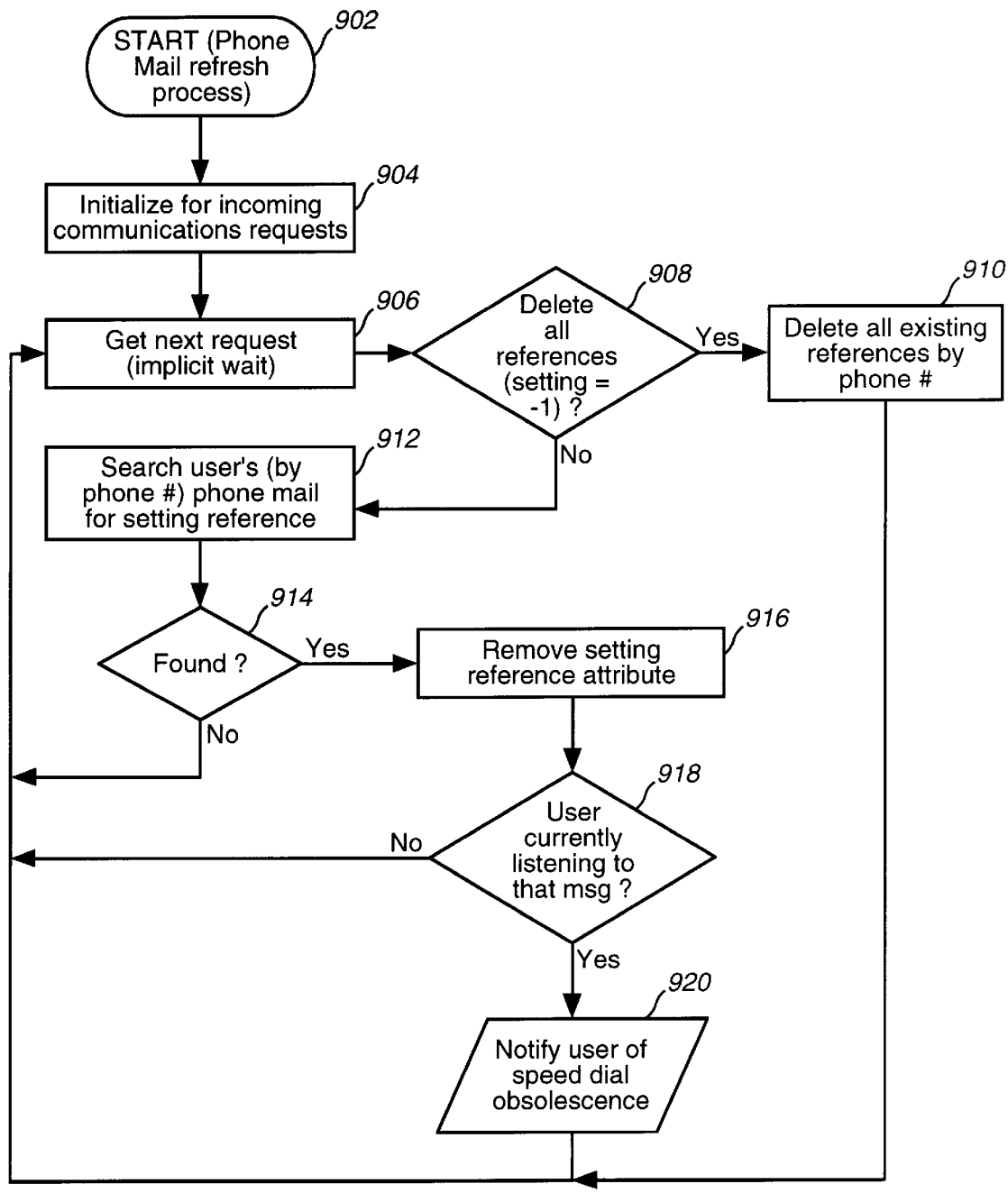
FIG. 9 is a flow diagram illustrating a phone mail refresh process 203, in accordance with the present invention.

The phone mail refresh process 203 is shown in the flow diagram of FIG. 9. The phone mail refresh process 203 begins at a step 902 and initializes for incoming communication requests at a step 804. Thereafter, a main request retrieval loop starts at a step 906. An implicit wait is performed if there is no request to retrieve. The phone mail refresh process 203 functions similarly to FIG. 7 in the sense that requests are placed in a queue and then processed from the queue in a FIFO order.

Upon retrieving a request in step 906, the phone mail refresh process 203 determines whether the request is to delete all references by determining whether the speed dial setting equals (−1). Configurator 202 step 1802 makes such a request. If the request is to delete all references of all speed dial settings, the phone mail refresh process deletes all existing references using the corresponding user phone number at step 910. Step 910 clears any existing speed dial references from all pending phone mail messages for the particular user. The process then returns to request retrieval step 906.

If the request is not to delete all references, the phone mail refresh process uses the user phone number to search the phone mail system for the old service speed dial setting provided in the request, as shown generally at a step 912. If a reference to the old speed dial setting is found, as shown at step 914, the phone mail refresh process removes speed dial setting reference attribute, as shown generally at step 916. Step 916 clears the reference that is about to be reused for a later received distribution.

The phone mail refresh process then determines whether the user is currently listening to that message, as shown generally at step 918. If so, the phone mail refresh process notifies the user of speed dial obsolescence, as shown generally at a step 920. Otherwise, the phone mail refresh process returns to the request retrieval step 906. If in step 914, no applicable message was found, then processing continues to step 906.

The PC refresh process 205, referred to above in step 822, will now be described in connection with the flow diagram of FIG. 10. The PC refresh process begins at a step 1002, initializes for incoming communications requests at a step 1004, and enters request retrieval step 1006. As with the phone mail refresh process (see FIG. 9), PC refresh requests are placed in a queue and processed from the queue in a FIFO order (see FIG. 11). When the PC refresh process receives a request to delete all references to a speed dial setting, as shown generally at a step 1008, all references to that setting (for each service on the PC) are deleted as shown generally at step 1010. Configurator 202 step 1810 makes such a request. The PC refresh process then returns to the request retrieval step 1006, as shown generally by 1012.

If the PC refresh process receives requests in which the old service parameter equals E-mail (OLD_SVC=E-mail), as shown in a step 1014, the user's mail folders (e.g., in-box and out-box) are searched for references using that speed dial setting parameter, as shown generally at a step 1016. If references are found, the PC refresh process removes the speed dial setting references, as shown at steps 1018 and 1020, respectively. The PC refresh process then determines whether the E-mail application user interface is active, at a step 1022. If so, the PC refresh process notifies the E-mail application (not shown) to refresh active resources, shown generally at a step 1024. The PC refresh process returns to the request retrieval step 1006 after notifying the E-mail application (at step 1024), or if the interface is not active, as determined at a step 1022. Step 1018 also returns to step 1006 if no references are found to contain the speed dial setting to be removed.

If the old service parameter equals fax (OLD_SVC=fax) in the request, as shown generally at a step 1026, the PC refresh process searches the user's fax folder for references to the speed dial setting parameter, as shown at a step 1028. If no reference is found, as determined at step 1030, the process proceeds to the request retrieval step 1006. Alternatively, any references to the speed dial setting parameter are removed at a step 1032. If the fax application user interface is active, the PC refresh process notifies the fax application to refresh active resources, as shown generally at steps 1034 and 1036, respectively. The PC refresh process returns to the request retrieval step 1006 after step 1036, or if step 1034 determines the fax application is not active.

Finally, if at step 1038 the old service parameter equals print (OLD_SVC=print), the PC refresh process searches the users print service folder for references to the speed dial setting parameter, as shown at step 1040. (The ability of the PC to examine the user's print folder, fax folder and E-mail folder(s) is functionality that would be apparent to a person skilled in the relevant art.) If no applicable references are found for the speed dial setting parameter, the PC refresh process returns to the request retrieval step 1006, as shown generally at a step 1042. If a reference is found, the PC refresh process removes the reference, as shown at a step 1044. The PC refresh process then determines whether the print server user interface is active, and if so, notifies the print server application to refresh active resources, shown generally at steps 1046 and 1048. The PC refresh process returns to the request retrieval step 1006 after step 1048, or if step 1046 determines the print application is not active.

Steps 1024, 1036, and 1048 enable visual removal of the obsolete speed dial setting if the setting may currently be displayed.

Figure 11:
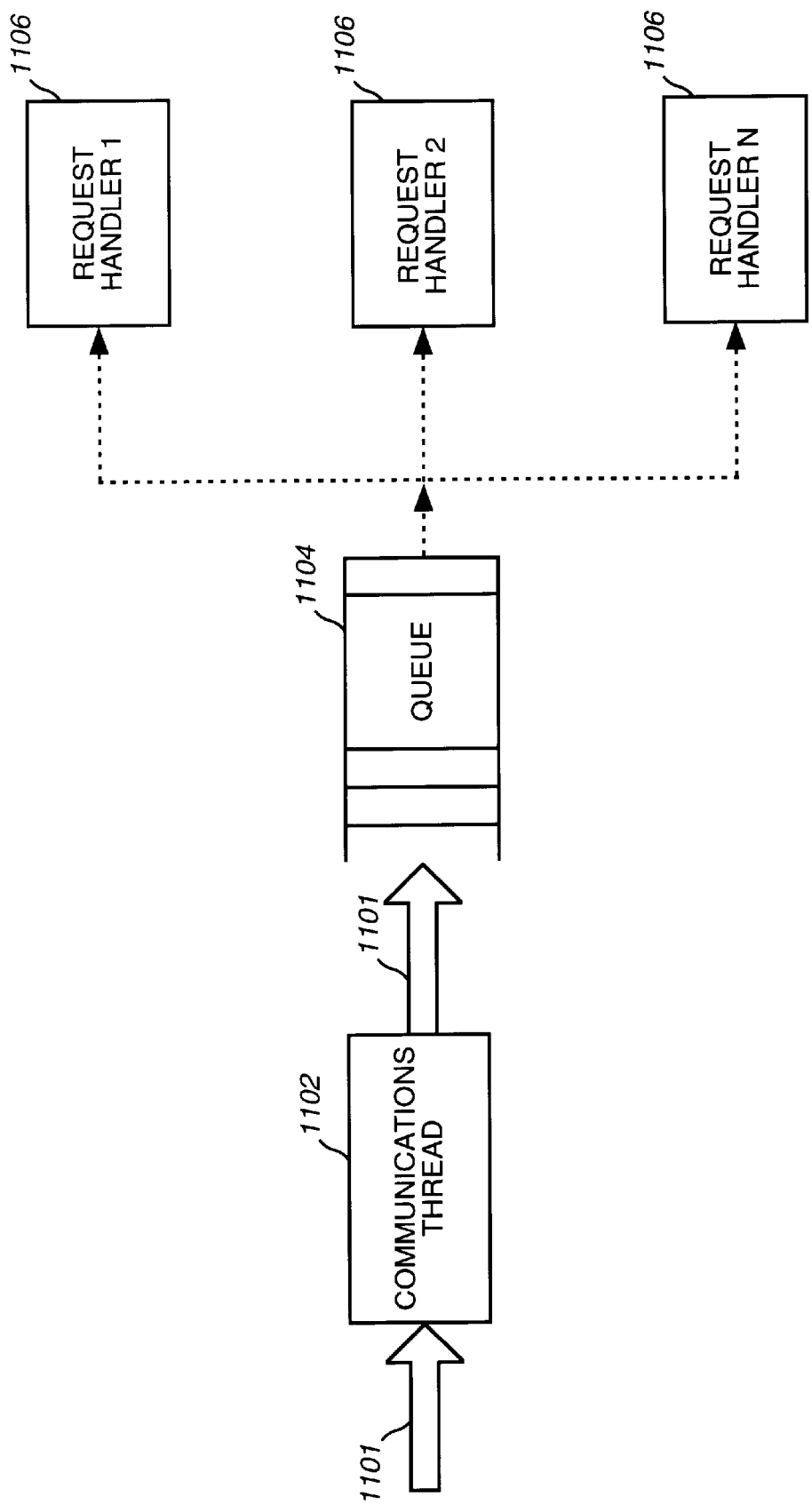
FIG. 11 illustrates a communications thread, process queue, and one or more asynchronously executing request handler threads, in accordance with the present invention.

The operations performed by the HDC (see FIGS. 7A, 7B and 7C), the phone mail refresh process (see FIG. 9), and the PC refresh process (see FIG. 10) are preferably implemented with a communications architecture as shown in FIG. 11. FIG. 11 includes a communication thread 1102, a queue 1104 and multiple requests handlers 1106. The communications thread 1102 manages protocol and inserts requests (1101) in to a process queue 1104. One or more asynchronously executing request handler threads 1–N (1106) process the next queue entry. Therefore, a single thread feeds the queue quickly and many threads handle the requests from the queue 1104. The "initialize for incoming communication requests" steps in FIGS. 7A, 9 and 10 implies spawning the communications thread after creating the queue, and then spawning one or more request handlers. For a large enterprise with many users, a sufficient number of HDC threads would be required to service all requests to the speed dial system.

In an alternate embodiment, code for the HDC 118 can actually be implemented at each manager permitting each manager to directly access the data without having to access a server. However, direct access would require each manager to be synchronized to the data.

c. Phone Call Monitor

As phone calls are received at PBX 114, the caller_id number is captured by the phone call monitor 204. The phone call monitor communicates the caller_id and the called number to the HDC 118 for all answered calls. HDC 118 queries the AB database 120 using the caller_id and retrieves the associated person's data. The HDC 118 also determines the appropriate speed dial setting using the called number and updates the appropriate entry in the SD database 122.

Figure 12:
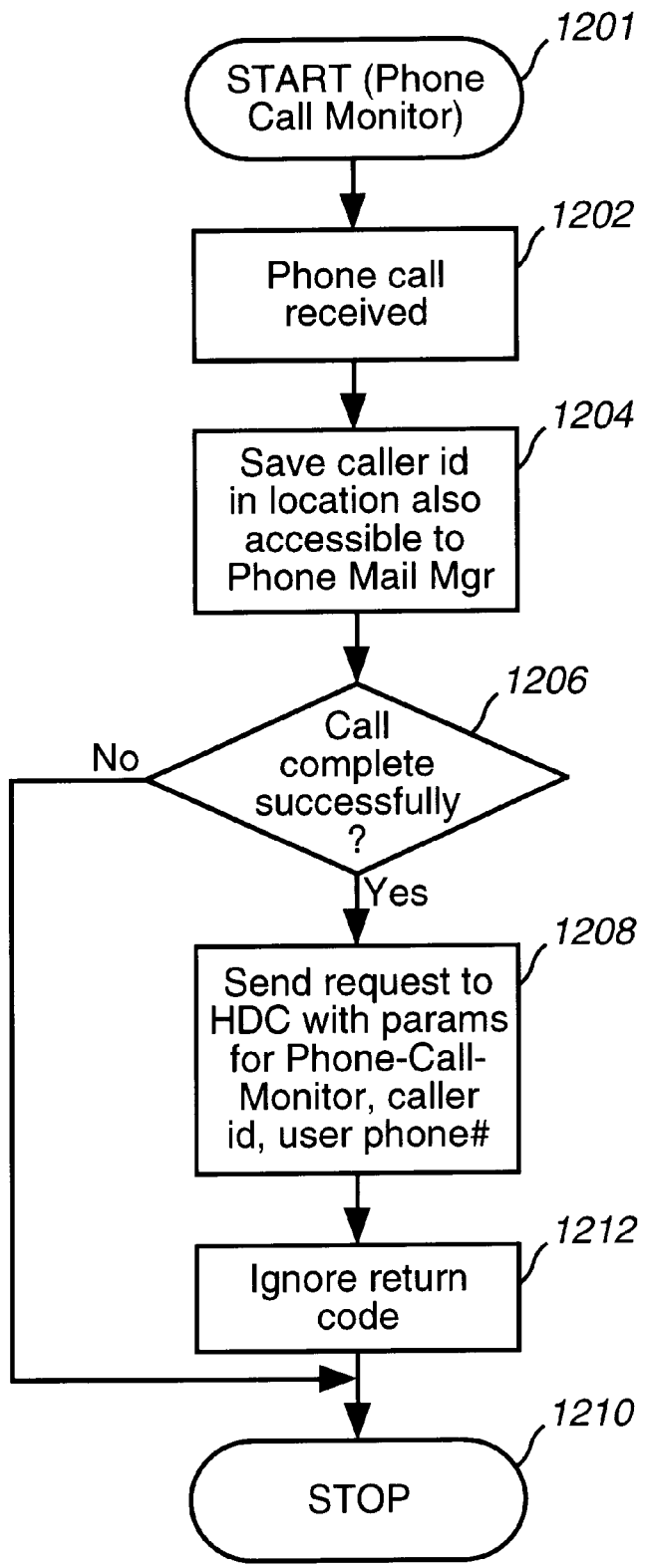
FIG. 12 is a flow diagram illustrating operation of phone call monitor 204, in accordance with the present invention.

A flow diagram illustrating the operation of the phone call monitor 204 will now be described in connection with FIG. 12. The phone call monitor 204 begins at step 1201 and tracks incoming telephone calls at a step 1202. According to a preferred embodiment of the present invention, the telephone system comprises a PBX 114, thus permitting the phone call monitor 204 to track a received phone call and save the caller_id and called number of the person that placed the phone call and the person who received the call, respectively.

A call monitor request is initiated when a user receives a phone call. The phone call monitor then saves the caller_id in a location also accessible to the phone mail manager 206, as shown generally at a step 1204. If the phone call completes successfully (e.g., the phone manually goes "off hook"), as shown at a decision step 1206, the phone call monitor sends a request to the DC 118 with a "phone_call_monitor" parameter, the caller_id and the user phone number (i.e., the called number targeted by the incoming call), as shown generally at a step 1208. After the request is sent to the HDC 118, the phone call monitor will ignore a return code since there is no information in the return useful to the phone call monitor, as shown generally at a step 212. Finally, once the return code is ignored or if the call does not successfully complete (at step 1206), the phone call monitor stops tracking the call, as shown at step 1210.

d. Phone Mail Manager

The phone call monitor communicates caller_id information to the phone mail manager for all calls that are not answered and a voice message is subsequently left. As noted above, the caller_id and called number is communicated to the HDC 118. The HDC queries the AB database 120 using the caller_id and retrieves the associated person's data. The HDC 118 also determines the appropriate speed dial setting using the called number and updates the appropriate entry in the SD database 122. The speed dial setting is communicated back to the phone mail manager for associating it with the message.

According to the present invention, the voice mail system on the PBX 114 will automatically provide verbal indication of speed dial numbers assigned to voice mail messages when the user reviews those messages. Thus, in addition to standard abstract information, such as when the user called and the duration or length of the voice mail message, the user will also be prompted with the speed dial setting in order to quickly return a phone call to the sender of any given voice mail message.

Figure 13:
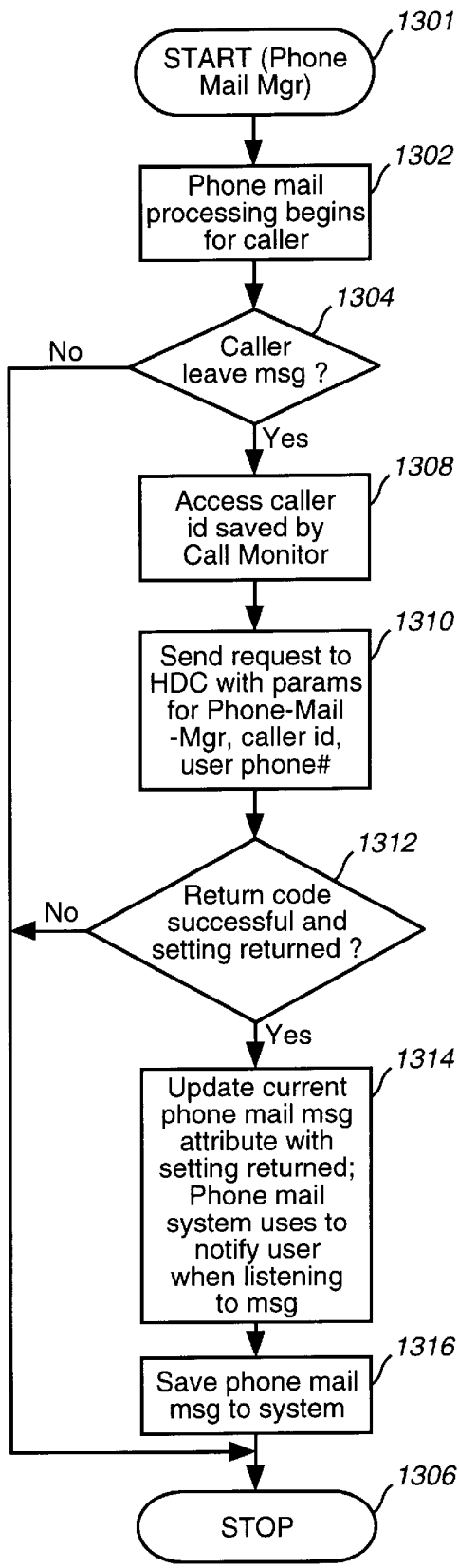
FIG. 13 is a flow diagram illustrating operation of phone mail manager 206, in accordance with the present invention.

A flow diagram illustrating the operation of phone mail manager 206 will now be described in connection with FIG. 13. Processing begins at step 1301 and the phone mail manager 206 begins tracking as soon as phone mail processing begins, as shown generally at step 1302. If no message is left by the caller, the phone mail manager simply stops, as shown generally by steps 1304 and 1306. Alternatively, if the caller leaves a message, the phone mail manager accesses the caller_id saved by the call monitor (see step 1204), as shown generally at a step 1308. The phone mail manager 1206 then sends a request to the HDC 118 with parameters for phone_mail_manager, the caller_id, and the user phone number (the called number), as shown generally at a step 1310. If a successful return code and speed dial setting corresponding to the message are received from the HDC 118, as shown generally at a step 1312, the phone mail manager will update the current phone mail message attributes at a step 1314. The user will be notified accordingly if the user is in the process of listening to the message which had the speed dial setting changed. The phone mail message is then saved to the system (as would be apparent to a person skilled in the relevant art), as shown generally at step 1316. Thereafter, processing ends at step 1306. If an unsuccessful return code is received at step 1312, the phone mail manager stops operation at step 1306 so that references are updated only if old references are removed.

e. E-mail Manager

As E-mail is received, the sender's E-mail address is communicated to the HDC 118 along with the user's phone number (made available to the PC 104 at install time). The HDC queries the AB database 120 using the E-mail address and retrieves the sender's data. The HDC 118 determines the appropriate speed dial setting (new setting) and updates the appropriate entry in the SD database 122. The speed dial setting is communicated back to the E-mail manager 208 for associating it with the delivery. The subject line is prefixed with the current speed dial setting for use by the user. If and when a speed dial setting becomes obsolete for a E-mail item, the E-mail item attribute is appropriately cleared.

A flow diagram illustrating operation of the E-mail manager 208 will now be described in connection with FIG. 14.

Processing begins at step 1401 and the E-mail manager detects receipt of an E-mail item at step 1402. The E-mail manager then sends a request to HDC 118 with the parameters E-mail manager, source mail address, and the user's phone number, as shown generally at a step 1404.

The E-mail manager 208 then determines if a successful return code and speed dial setting are received from the HDC 118, as shown generally at a step 1406. If a successful return is received, the E-mail manager updates the received E-mail item attribute in step 1408 with the received speed dial setting, and the E-mail system uses the attribute for displaying the speed dial setting to the user. Once this is done, or if an unsuccessful return code is received from HDC 118, the E-mail manager stops processing, as shown generally at a step 1410.

f. Fax Manager

As soft faxes are received on the computer system or by the computer system fax server component, the caller_id number is captured. The caller_id is communicated to the HDC 118 for all calls that are answered. The HDC queries the AB database 120 using the caller_id against the fax number field 314 and retrieves the person's data. The HDC 118 determines the appropriate speed dial setting and updates the appropriate entry in the SD database 122. Associated with each received fax is the speed dial setting for the particular item.

Figure 15:
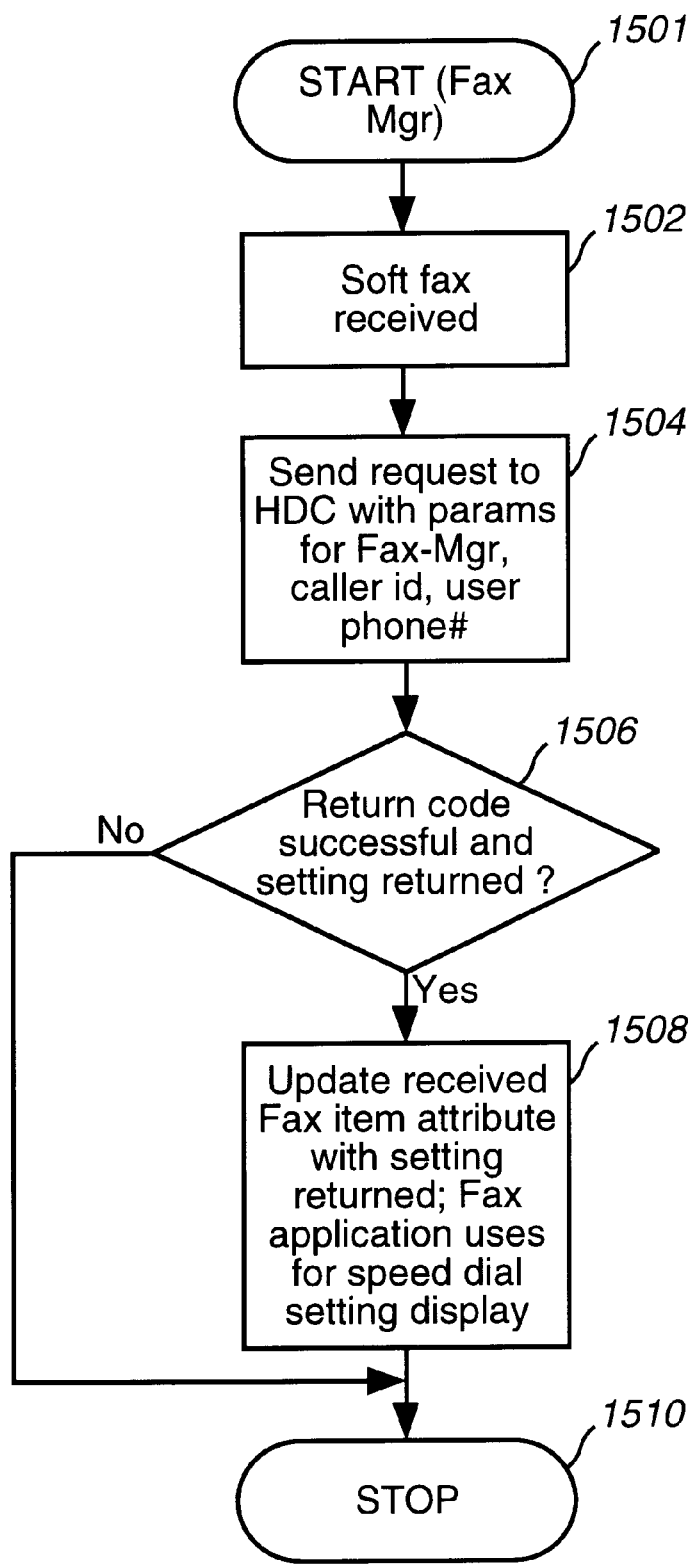
FIG. 15 is a flow diagram illustrating operation of fax manager 210, in accordance with the present invention.

A flow diagram of the operations performed by the fax manager 210 is shown in FIG. 15. Processing begins at step 1502 and the fax manager 210 detects receipt of a soft fax (at the user's personal computer, or the like), as shown generally at a step 1502. The fax manager sends a request to the HDC 118 with the parameters fax_manager, caller_id and the user's phone number, as shown generally at a step 1504.

The fax manager then determines whether a successful return code and speed dial setting have been received from the HDC, as shown generally at a step 1506. If a successful return code and speed dial setting have been received, the fax manager 210 updates the received fax item attribute at step 1508 with the speed dial setting and the fax application (running on the PC, for example) displays the speed dial setting to the user. The fax manager then stops processing as shown generally at a step 1510. Processing is also stopped if an unsuccessful return code is detected at step 1506.

g. Print Manager

As documents are printed by the computer system print server application, the LAN address of the requester is captured and is communicated to the HDC 118. The HDC queries the AB database 120 using the LAN address and retrieves the person's data. The HDC 118 determines the appropriate speed dial setting and updates the appropriate entry in the SD database 122. The speed dial setting is communicated back to the print manager for associating it with the printed job. As the user browses a historical log of printed jobs, associated therewith is the speed dial setting for the particular item. If, and when, a speed dial setting becomes obsolete for an item, the item attribute is appropriated cleared.

Figure 16:
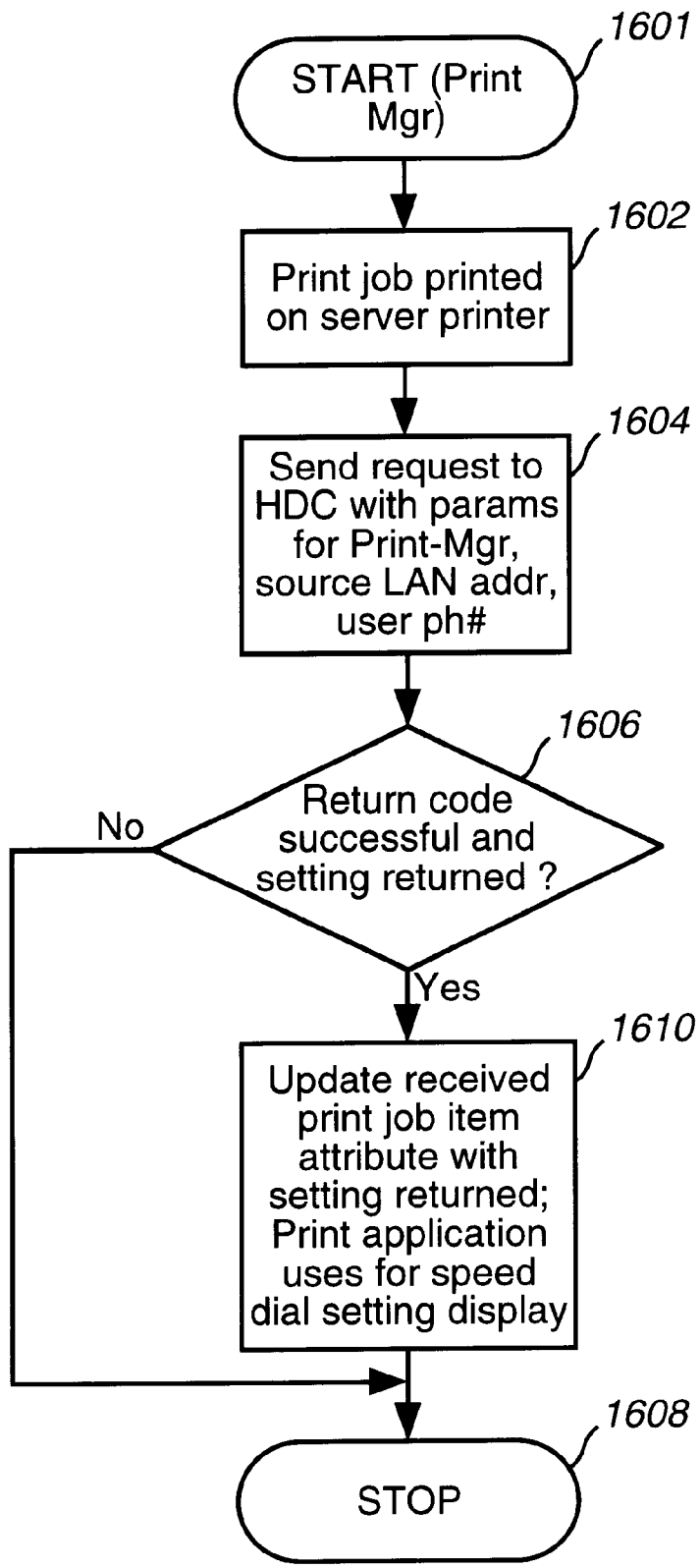
FIG. 16 is a flow diagram illustrating operation of print manager 212, in accordance with the present invention.

A flow diagram of the operation of the print manager 212 is shown in FIG. 16. Processing begins at step 1601. Receipt of a print job (i.e., a print request) is detected by the PC 104 (which is configured as a print server in a preferred embodiment), as shown at a step 1602. The print manager 212 then sends a request to the HDC 118 with the parameters print_manager, source LAN address and the user's phone number, as shown at a step 1604.

The print manager 212 then determines whether a successful return code is received from the HDC 118 along with an assigned speed dial setting, as shown generally at a step 1606. If an unsuccessful return code is received at step 1606, the print manager stops processing as shown at a step 1608. Otherwise, the printer manager 212 updates the received print job item attribute in step 1610 with the speed dial setting returned by the HDC 118 and the print application displays it or otherwise makes the setting available to the user, as shown at a step 1610. The print manager processing then stops as shown at step 1608.

h. Speed Dialer

Figure 17:
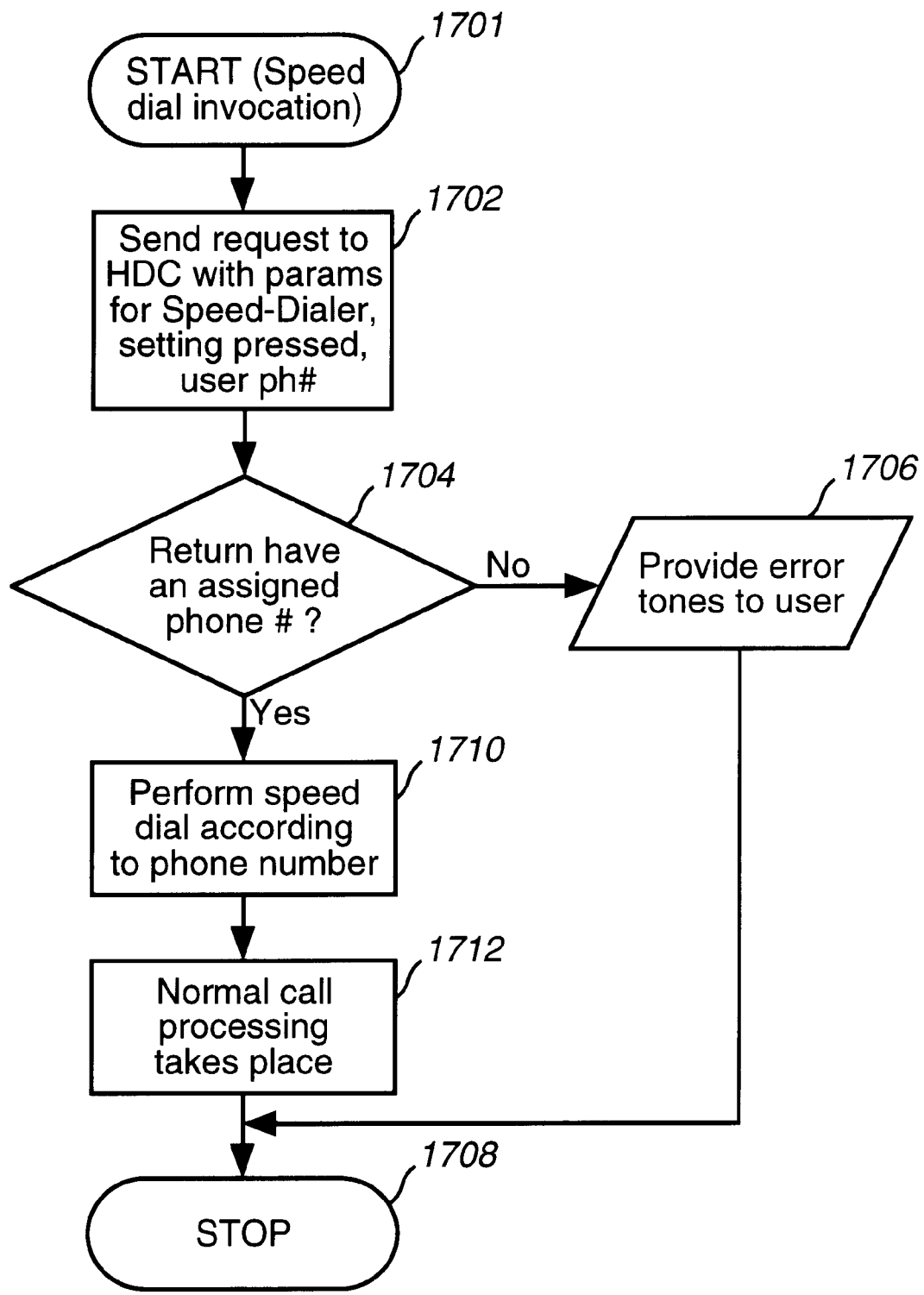
FIG. 17 is a flow diagram illustrating a speed dialer invocation process 214, in accordance with the present invention.

A flow diagram illustrating the operation of the speed dialer 214 will now be described in connection with FIG. 17. Processing begins at step 1701 upon the user invoking a speed dial sequence. Upon receipt from the user of a speed dial invocation (i.e., the user has pressed keys on his phone to initiate a speed dial), the speed dialer 214 sends a request to the HDC 118 with the parameters speed_dialer, the speed dial setting pressed and the user's phone number, as shown generally at a step 1702. The speed dialer 214 then determines whether the HDC 118 returns an assigned phone number, as shown generally at a step 1704. If not, the speed dialer provides error tones (e.g., DTMF tones) to the user, as shown at a step 1706 and stops processing as shown at 1708. Alternatively, if a phone number corresponding to the elected speed dial setting is returned by the HDC 118, the speed dialer 214 performs the speed dial according to that number, as shown generally at a step 1710. Normal call processing then takes place, as shown at 1712, and then the speed dialer 214 stops processing at step 1708.

In another embodiment of the present invention, speed dialing can be invoked directed from the PC 104. The PC 104 can include a built-in microphone, speaker and full-duplex communications software for speed dialing directly from the PC 104. The PC's GUI can be programmed to permit the user to select a speed dial setting from any one of the manager interfaces using the PC's pointing device and initiate a phone call without using the telephone keypad or handset.

i. Computer Program Product

Figure 19:
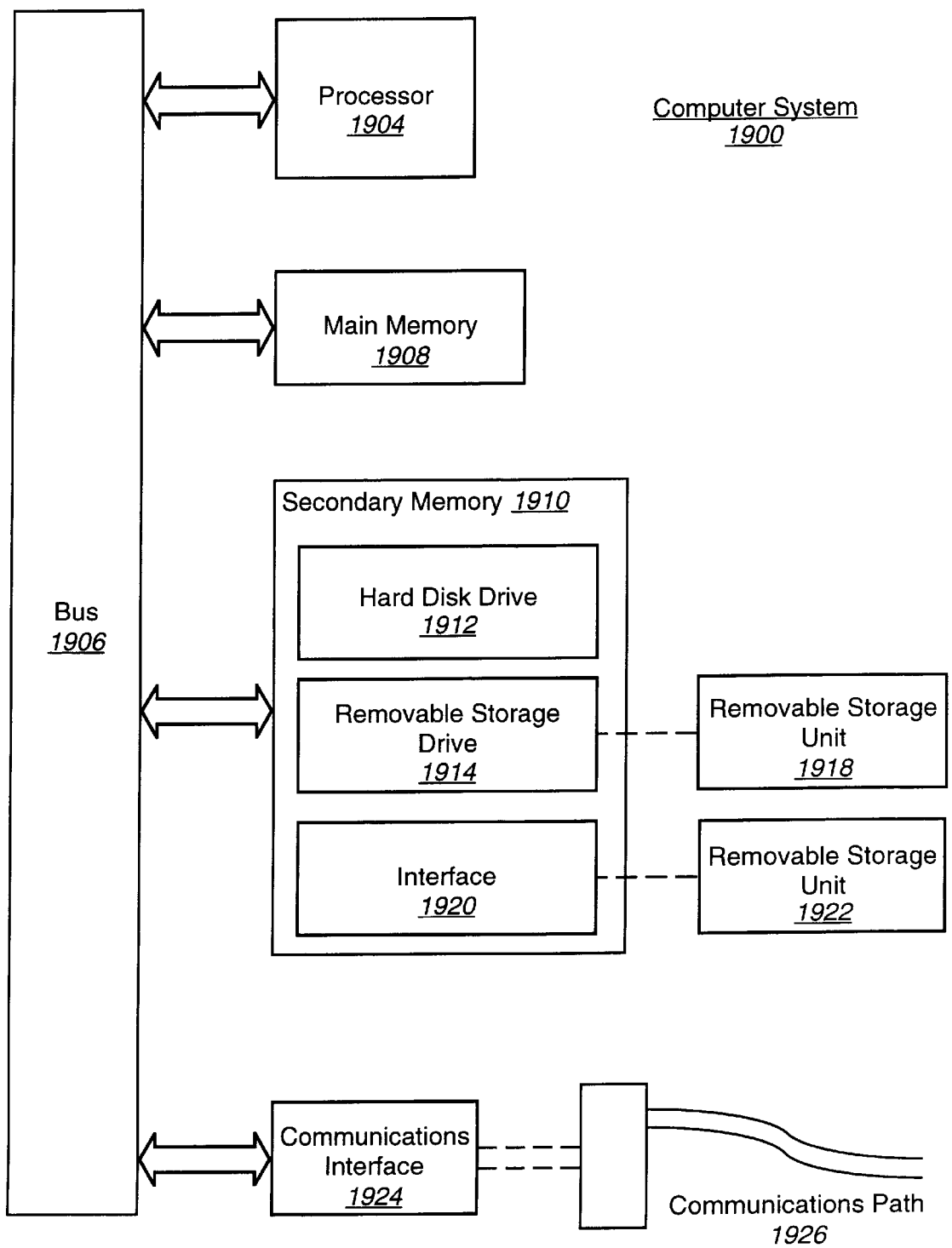
FIG. 19 is an alternative computer environment for implementing automated speed dialing according to the present invention.

An alternative computer environment for implementing the invention is shown in FIG. 19. The environment is a computer system 1900 that includes one or more processors (CPU), such as processor 1904. The processor 1904 is connected to a communications bus 1906. Various software embodiments are described in terms of this example computer system. After reading this description, it will be apparent to a person skilled in the relevant art how to implement the invention using other computer systems and/or computer architectures. Computer system 1900 can be used to implement PC 104, PBX 114 and/or HDC 118.

Computer system 1900 also includes a main memory 1908, preferably random access memory (RAM), and can also include a secondary memory 1910. The secondary memory 1910 can include, for example, a hard disk drive 1912 and/or a removable storage drive 1914, representing a floppy disk drive, a magnetic tape drive, an optical disk drive, etc. The removable storage drive 1914 reads from and/or writes to a removable storage unit 1918 in a well known manner. Removable storage unit 1918 represents a floppy disk, magnetic tape, optical disk, etc., which is read by and written to by removable storage drive 1914. As will be appreciated, the removable storage unit 1918 includes a computer usable storage medium having stored therein computer software and/or data.

In alternative embodiments, secondary memory 1910 may include other similar means for allowing computer programs or other instructions to be loaded into computer system

1900. Such means can include, for example, a removable storage unit 1922 and an interface 1920. Examples can include a program cartridge and cartridge interface, a removable memory chip (such as an EPROM, PROM, or PCMCIA) and associated socket, and other removable storage units 1922 and interfaces 1920 which allow software and data to be transferred from the removable storage unit 1922 to computer system 1900. Any of the aforementioned memory devices can be used to implement a database.

Computer system 1900 can also include a communications interface 1924. Communications interface 1924 allows software and data to be transferred between computer system 1900 and external devices via communications path 1926. Examples of communications interface 1924 can include modem 106, printer 108, a communications port, etc. Software and data transferred via communications interface 1924 are in the form of signals that can be electronic, electromagnetic, optical or other signals capable of being received by communications interface 1924 via communications path 1926. Note that communications interface 1924 provides a means by which computer system 1900 can interface to a network such as LAN 110.

The present invention is preferably implemented using software running (that is, executing) in an environment similar to that described above with respect to FIG. 19. Thus, the term "computer program product" is used to generally refer to a program stored at removable storage device 1918 or a hard disk installed in hard disk drive 1942. These computer program products are means for providing software to computer system 1900.

Computer programs (also called computer control logic) are stored in main memory and/or secondary memory 1940. Computer programs can also be received via communications interface 1924. Such computer programs, when executed, enable the computer system 1900 to perform the features of the present invention as discussed herein. In particular, the computer programs, when executed, enable the processor 1904 to perform the features of the present invention. Accordingly, such computer programs represent controllers of the computer system 1900.

In an embodiment where the invention is implemented using software, the software may be stored in a computer program product and loaded into computer system 1900 using removable storage drive 1914, hard drive 1942 or communications interface 1924. Alternatively, the computer program product may be downloaded to computer system 1900 over communications path 1926. The control logic (software), when executed by the processor 1904, causes the processor 1904 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

3. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for configuring speed dial settings on a telephone system, comprising the steps performed by the telephone of:
   receiving a distribution, wherein said distribution includes a source identifier (id) associated with a sender of said distribution;
   determining, in response to receipt of said distribution, said id associated with a sender of said distribution;
   accessing information about said sender in response to determining said id; and
   assigning a speed dial setting using said information, wherein the telephone system automatically dials the sender in response to invocation of said speed dial setting.

2. The method according to claim 1, wherein said receiving step further comprises the step of receiving a voice mail distribution.

3. The method according to claim 1, wherein said receiving step further comprises the step of receiving a phone call.

4. The method according to claim 1, further comprising the step of displaying said speed dial setting.

5. The method according to claim 1, further comprising the step of modifying said speed dial setting in response to user input.

6. The method according to claim 1, further comprising the step of organizing said speed dial setting into a partition.

7. The method according to claim 6, further comprising the step of assigning a limited number of distribution types to said partition.

8. A system for configuring speed dial settings on a telephone system, comprising:
   a speed dial database;
   an address book database;
   a historical distribution correlator, wherein in response to the telephone system receiving a communication from a sender, said historical distribution correlator:
      determines an identifier corresponding to the sender of the communication, wherein said communication includes said identifier,
      reads information from said address book using said identifier, and
      writes data to said speed dial database using said information to configure a speed dial setting.

9. The system according to claim 8, wherein said communication comprises at least one of a telephone call, voice mail distribution, E-mail distribution, facsimile distribution and print distribution.

10. The system according to claim 8, wherein said speed dial database includes at least one partition permitting a user to specify a plurality of distribution assignments for each speed dial setting.

11. A method for programming speed dial data in a telephone system that corresponds to a plurality of distributions, comprising the steps performed by the telephone of:
   receiving more than one distribution type, wherein each of said distribution types include a source identifier associated with a sender and said distribution types include at least one of the following: phone call, voice messages, E-mail messages, soft facsimiles and electronic print jobs from a print queue;
   determining return call numbers for said senders of said distribution types using said source identifiers;
   assigning speed dial settings to selected ones of said return call numbers associated with said senders; and providing access to said stored information and said assigned speed dial settings.

12. The method according to claim 11, further comprising the step of invoking one of said assigned speed dial settings.

13. The method according to claim 11, further comprising the step of displaying a subset of said assigned speed dial settings.

14. The method according to claim 11, further comprising the step of modifying one of said assigned speed dial settings in response to user input.

15. The method according to claim 11, further comprising the step of organizing said assigned speed dial settings into partitions according to said distribution types.

16. The method according to claim 15, further comprising the step of limiting the number of said distribution types assigned to a given partition.

17. A method for configuring speed dial settings on a telephone system, comprising the steps performed by the telephone of:

receiving an E-Mail distribution;

determining, automatically upon receipt of said distribution, an identifier (id) corresponding to a sender of said distribution;

accessing information about said sender using said id; and assigning a speed dial setting using said information;

wherein the telephone system permits a user to automatically dial the sender by invocation of said speed dial setting.

18. A method for configuring speed dial settings on a telephone system, comprising the steps performed by the telephone of:

receiving a facsimile distribution;

determining, automatically upon receipt of said distribution, an identifier (id) corresponding to a sender of said distribution;

accessing information about said sender using said id; and assigning a speed dial setting using said information;

wherein the telephone system permits a user to automatically dial the sender by invocation of said speed dial setting.

19. A method for configuring speed dial settings on a telephone system, comprising the steps performed by the telephone of:

receiving a electronic job from a print queue print distribution;

determining, automatically upon receipt of said distribution, an identifier (id) corresponding to a sender of said distribution;

accessing information about said sender using said id; and assigning a speed dial setting using said information;

wherein the telephone system permits a user to automatically dial the sender by invocation of said speed dial setting.

20. A system for automatically configuring speed dial settings on a telephone system, comprising:

a speed dial database, wherein said speed dial database comprises a number of rows equal to a number of possible speed dial settings and a number of columns including a distribution type, a speed dial setting, and a speed dial setting assignment;

an address book database;

a historical distribution correlator, wherein when the telephone system receives a communication, said historical distribution correlator:

determines an identifier (id) corresponding to a sender of the communication, reads information from said address book using said id, and writes data to said speed dial database using said information to configure a speed dial setting.

* * * * *